(12) United States Patent
Katayama et al.

(10) Patent No.: US 7,876,830 B2
(45) Date of Patent: Jan. 25, 2011

(54) VIDEO ENCODER AND DECODER FOR ACHIEVING INTER-AND INTRA-FRAME PREDICTIONS WITH REDUCED MEMORY RESOURCE

(75) Inventors: Yoichi Katayama, Kanagawa (JP); Hisashi Takamura, Shizuoka (JP)

(73) Assignee: Renesas Electronics Corporation, Kanagawa (JP)

( * ) Notice: Subject to any disclaimer, the term of this patent is extended or adjusted under 35 U.S.C. 154(b) by 1350 days.

(21) Appl. No.: 11/376,197

(22) Filed: Mar. 16, 2006

(65) Prior Publication Data

US 2006/0209960 A1 Sep. 21, 2006

(30) Foreign Application Priority Data

Mar. 17, 2005 (JP) ............................. 2005-077922

(51) Int. Cl.
*H04N 7/12* (2006.01)
(52) U.S. Cl. ...................... 375/240.16; 375/240.18; 375/240.24; 375/240.12; 375/240.23; 382/238; 382/246
(58) Field of Classification Search ................. 375/240, 375/240.16, 240.12, 240.18, 240.23, 240.24; 345/204; 382/238, 246
See application file for complete search history.

(56) References Cited

U.S. PATENT DOCUMENTS

| 6,345,121 | B1 | 2/2002 | Matsumoto |
| 6,560,363 | B2 | 5/2003 | Matsumoto |
| 6,567,555 | B2 | 5/2003 | Matsumoto |
| 6,608,939 | B2 | 8/2003 | Matsumoto |
| 6,658,152 | B2 | 12/2003 | Matsumoto |
| 6,681,048 | B2 | 1/2004 | Matsumoto |
| 6,697,527 | B2 | 2/2004 | Matsumoto |
| 6,798,916 | B2 | 9/2004 | Matsumoto |
| 6,920,176 | B2 | 7/2005 | Kajita et al. |
| 7,010,168 | B2* | 3/2006 | Suh et al. .................... 382/238 |
| 7,426,308 | B2* | 9/2008 | Hsu et al. .................... 382/239 |
| 2001/0033697 | A1* | 10/2001 | Shimada ..................... 382/246 |
| 2002/0006162 | A1* | 1/2002 | Nakao et al. ........... 375/240.16 |
| 2002/0011997 | A1* | 1/2002 | Sotoda et al. ............... 345/204 |
| 2005/0078754 | A1* | 4/2005 | Liang et al. ............ 375/240.18 |

FOREIGN PATENT DOCUMENTS

| JP | 11-75200 A | 3/1999 |
| JP | 2002-118853 | 4/2002 |
| JP | 2002-232887 A | 8/2002 |
| JP | 2004-274411 | 9/2004 |
| WO | WO 2004/045079 A2 | 5/2004 |

* cited by examiner

*Primary Examiner*—Eva Y Puente
(74) *Attorney, Agent, or Firm*—Foley & Lardner LLP

(57) ABSTRACT

A video encoder is composed of a DC/AC prediction unit performing DC/AC prediction, a motion vector prediction unit performing motion vector prediction, and a memory. The memory is accessible from both of the DC/AC prediction unit and the motion vector prediction unit.

10 Claims, 34 Drawing Sheets

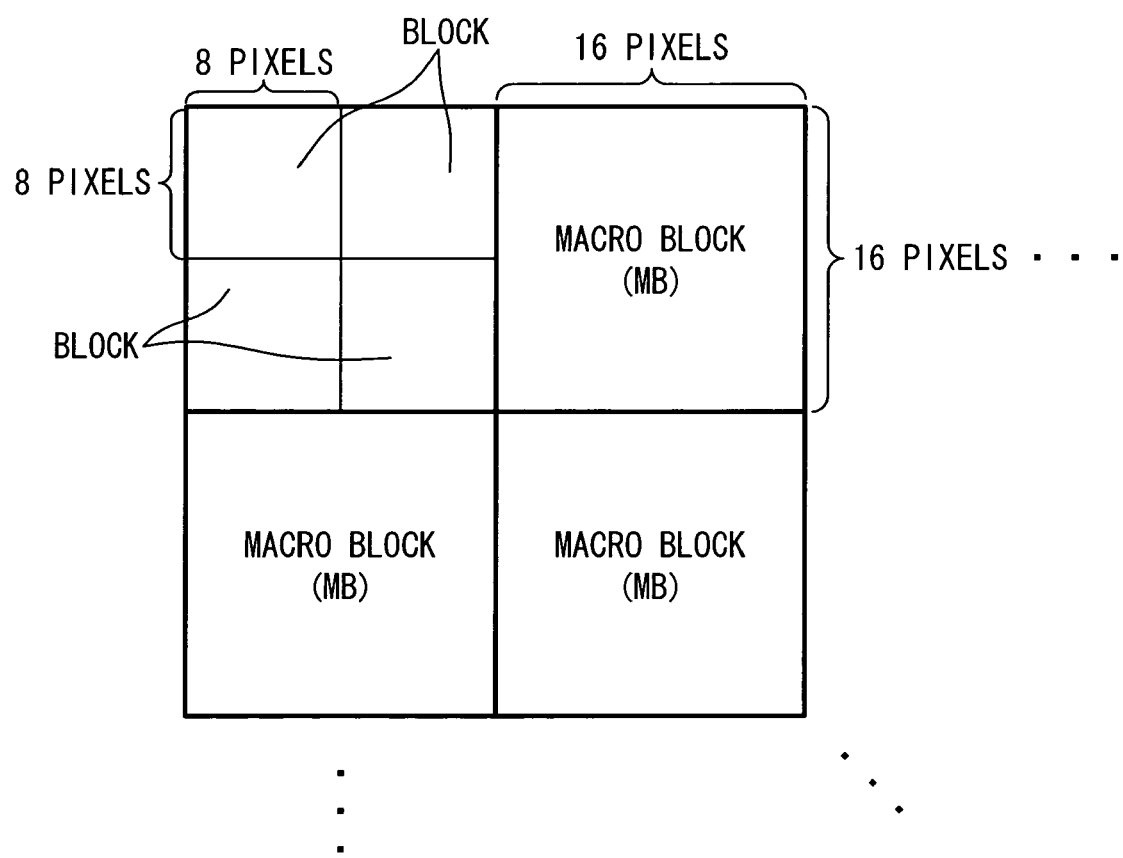

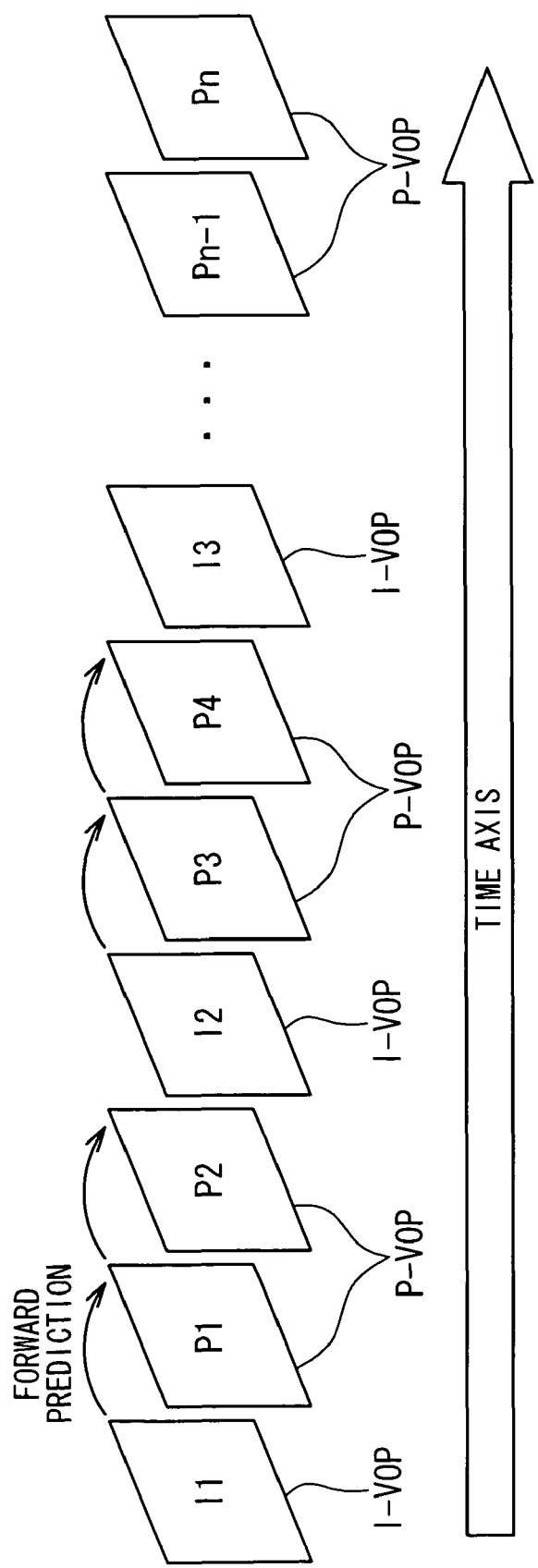

Fig. 10A
JUST BEFORE DC/AC PREDICTION FOR MACRO BLOCK MB (i, 1)
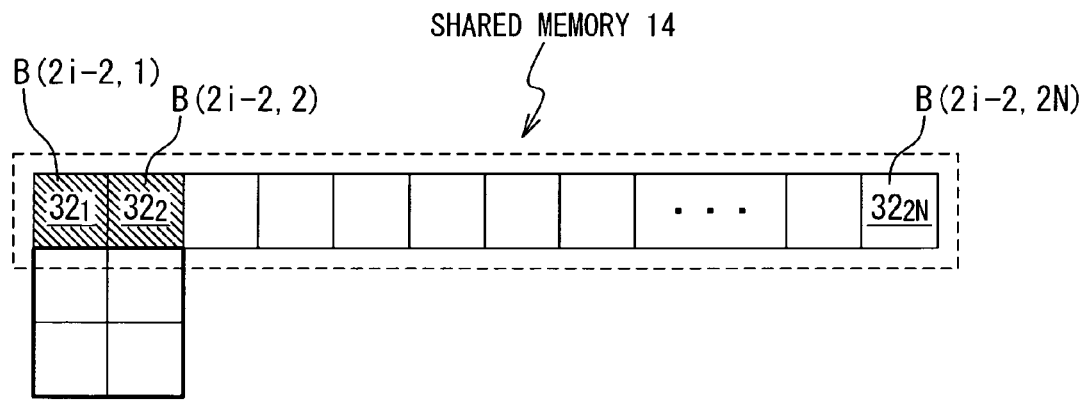
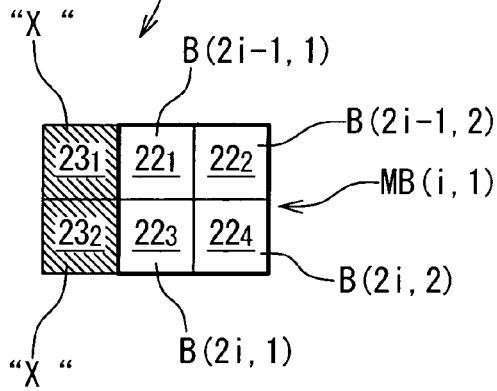
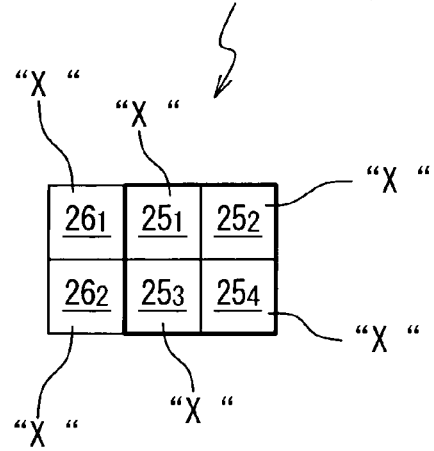

Fig. 11A
JUST BEFORE MOTION VECTOR PREDICTION FOR MACRO BLOCK MB (i, 1)
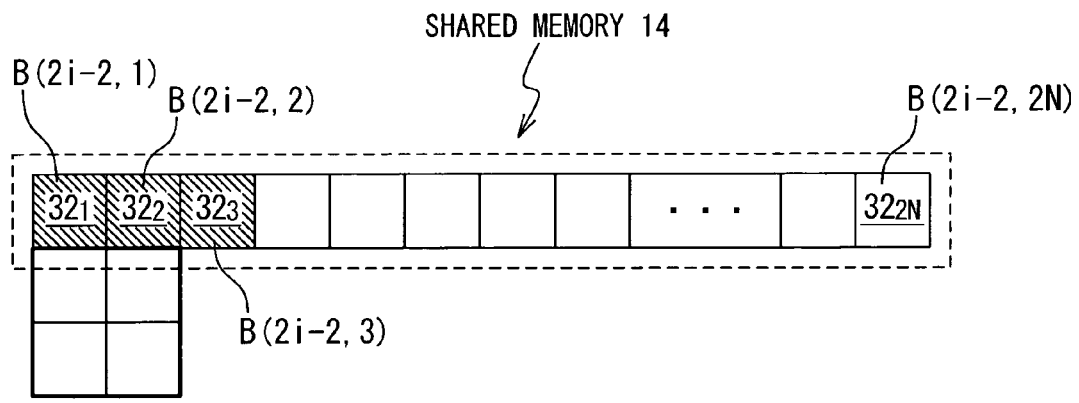
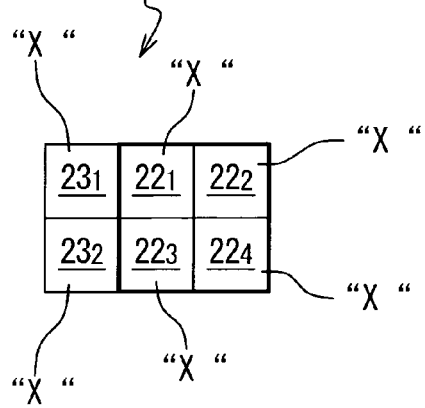
TEMPORARY MEMORY 21
(WITHIN DC/AC
PREDICTION UNIT 4)
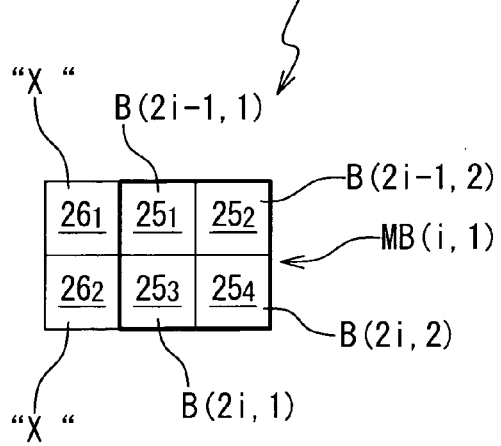
TEMPORARY MEMORY 24
(WITHIN MOTION VECTOR
PREDICTION UNIT 13)

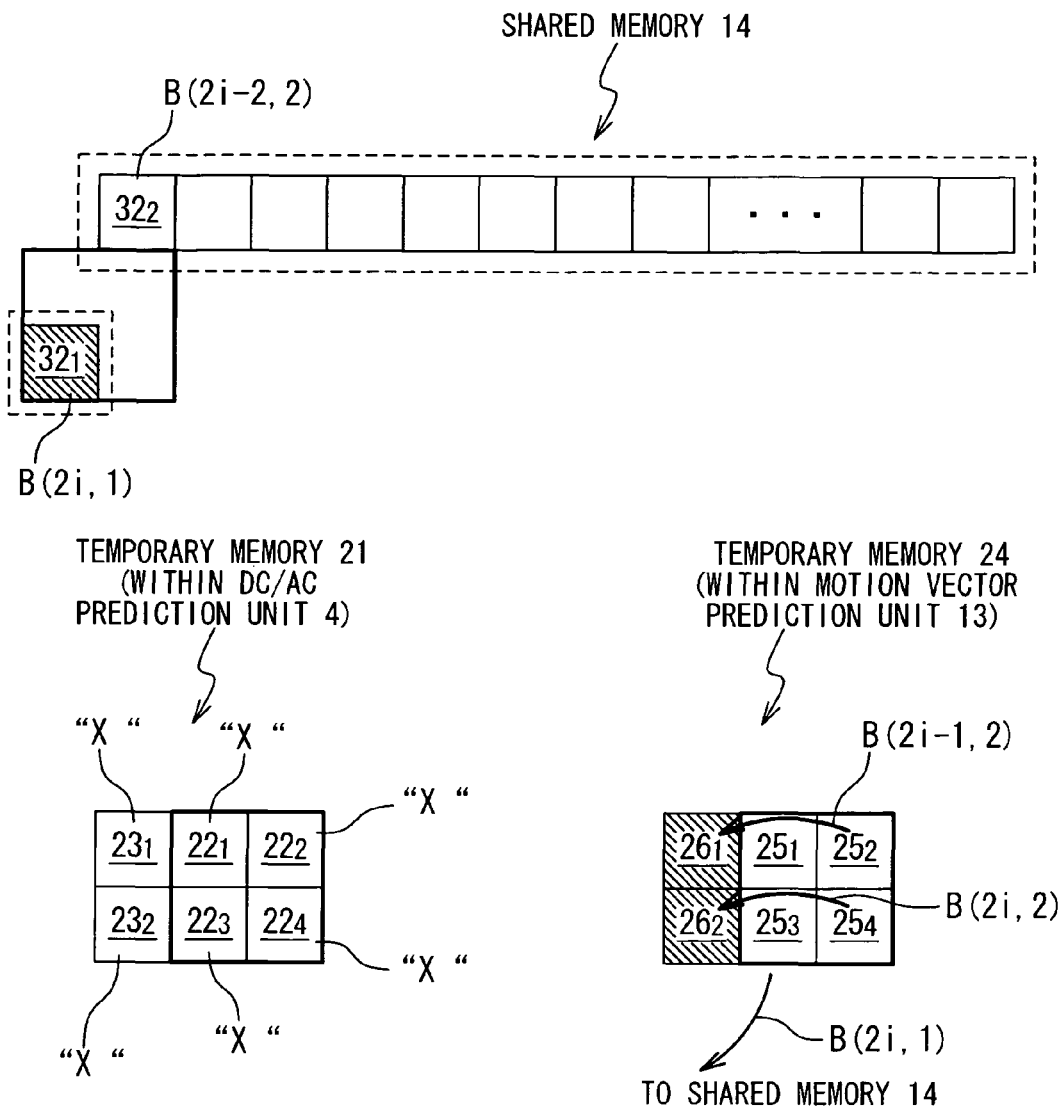

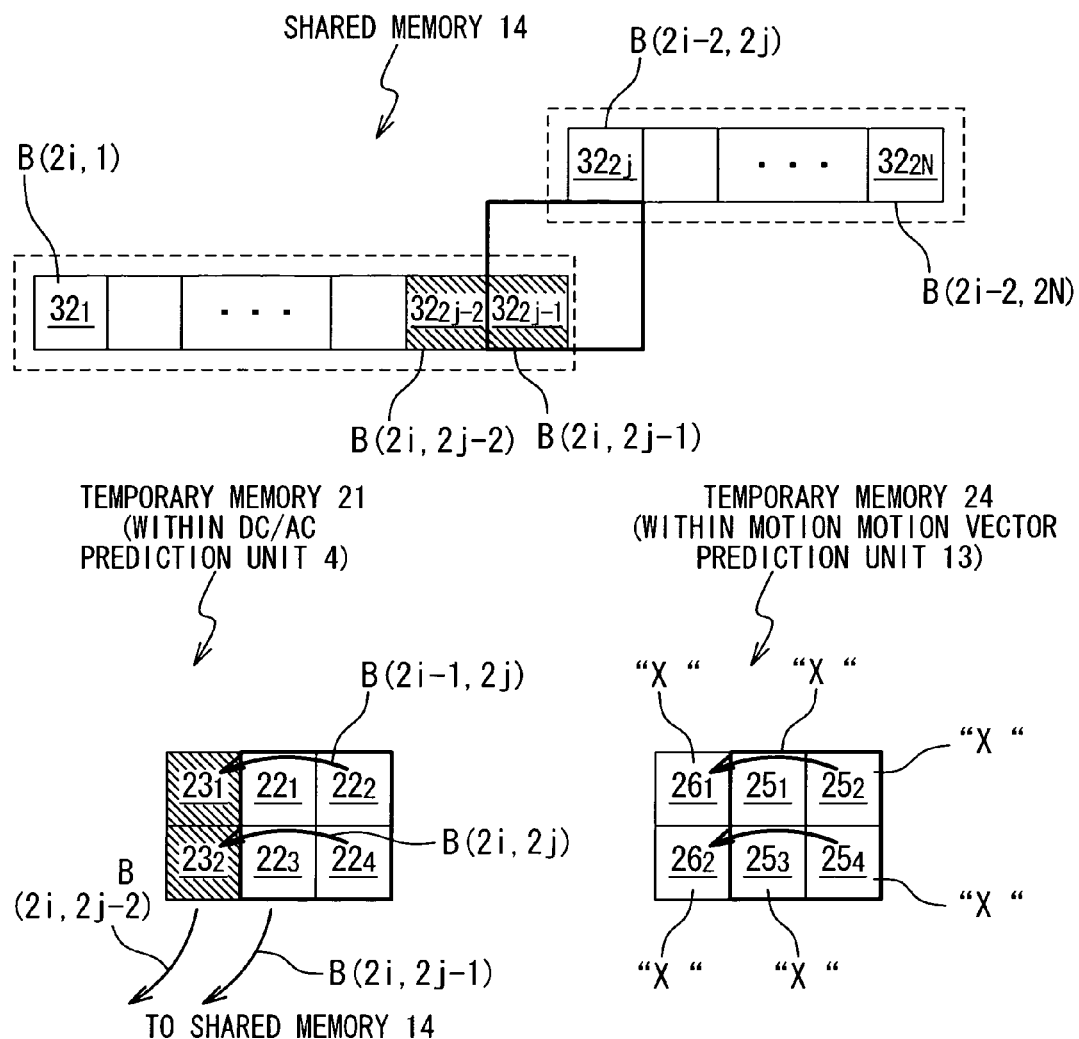

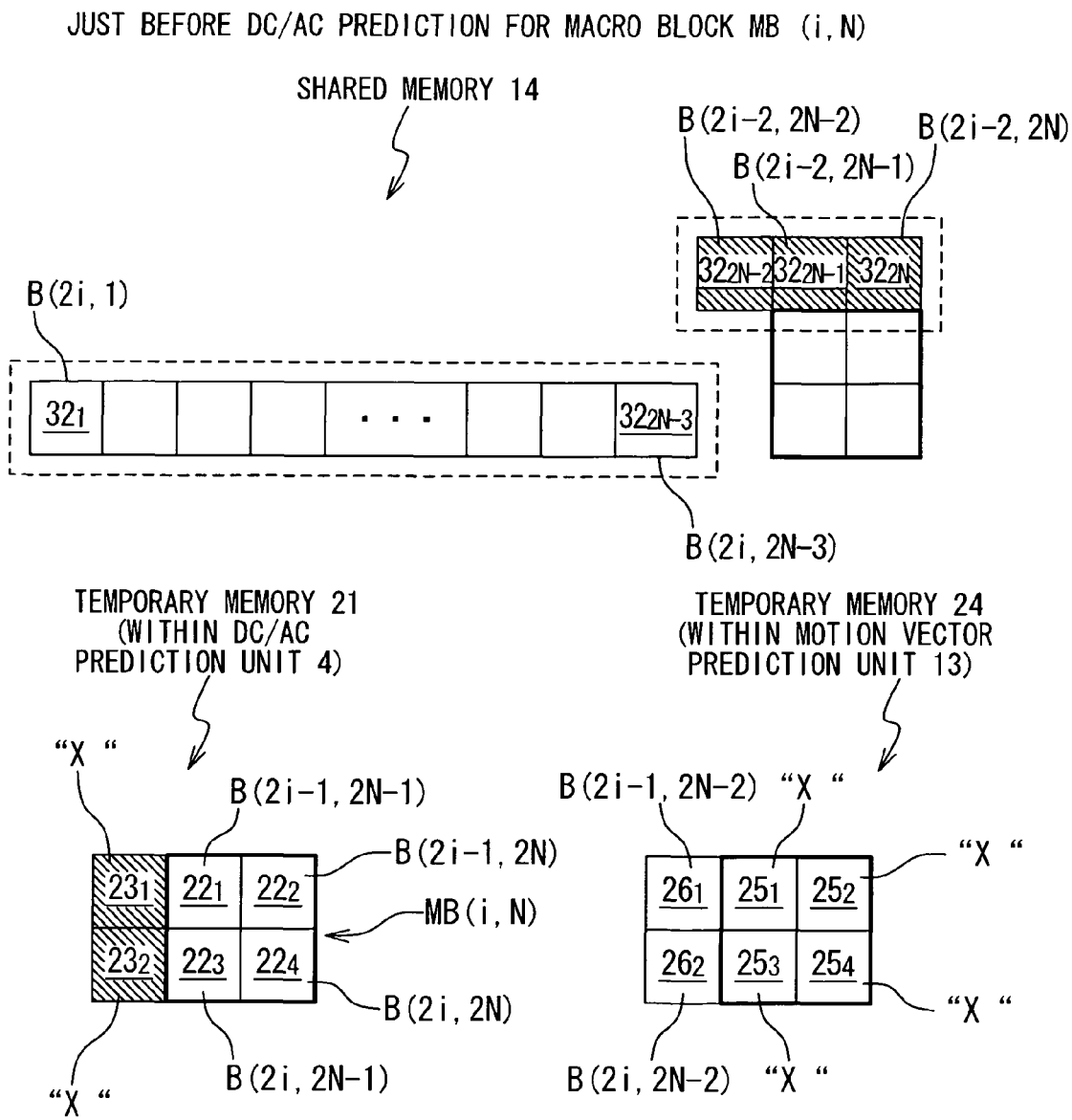

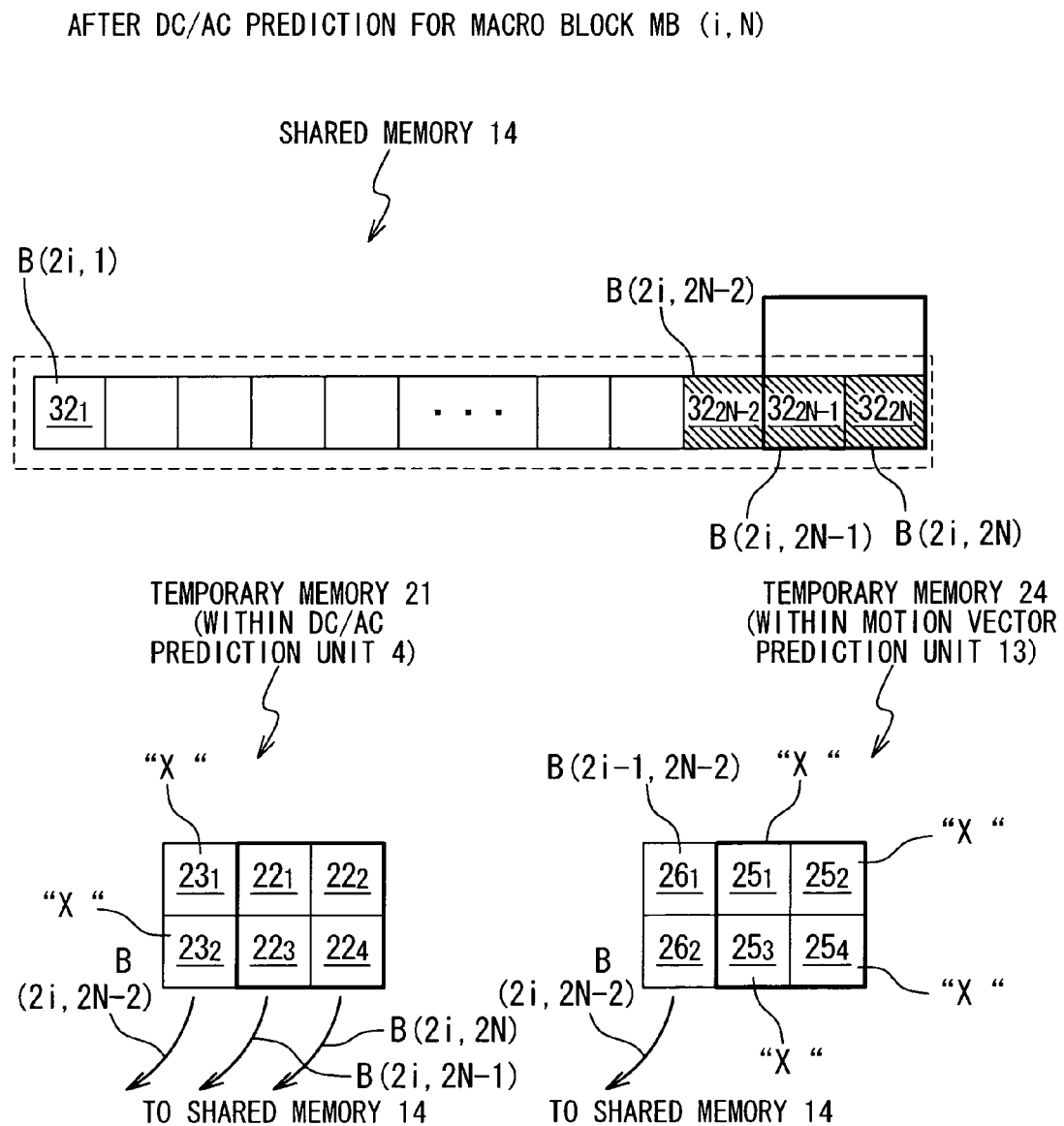

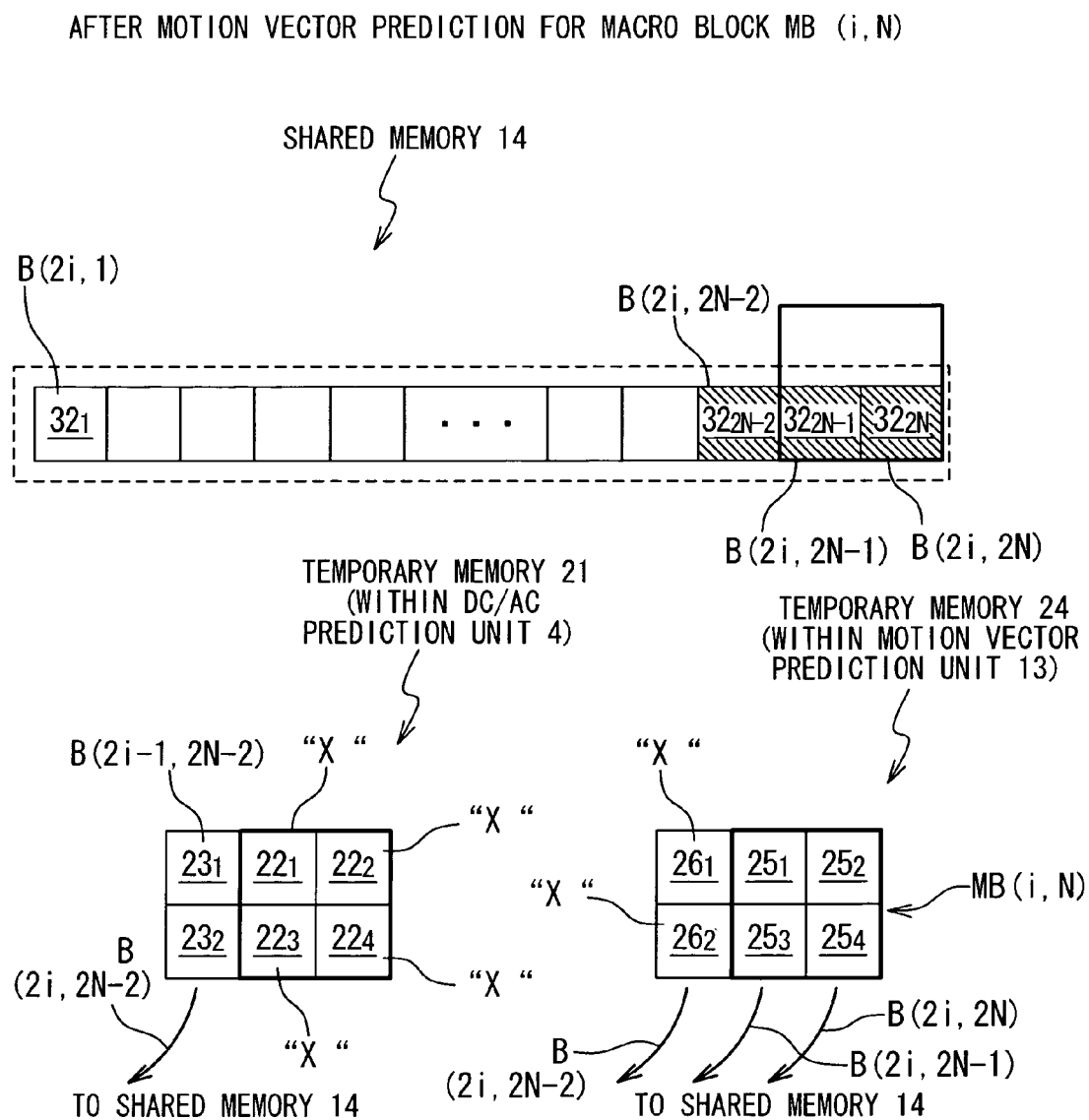

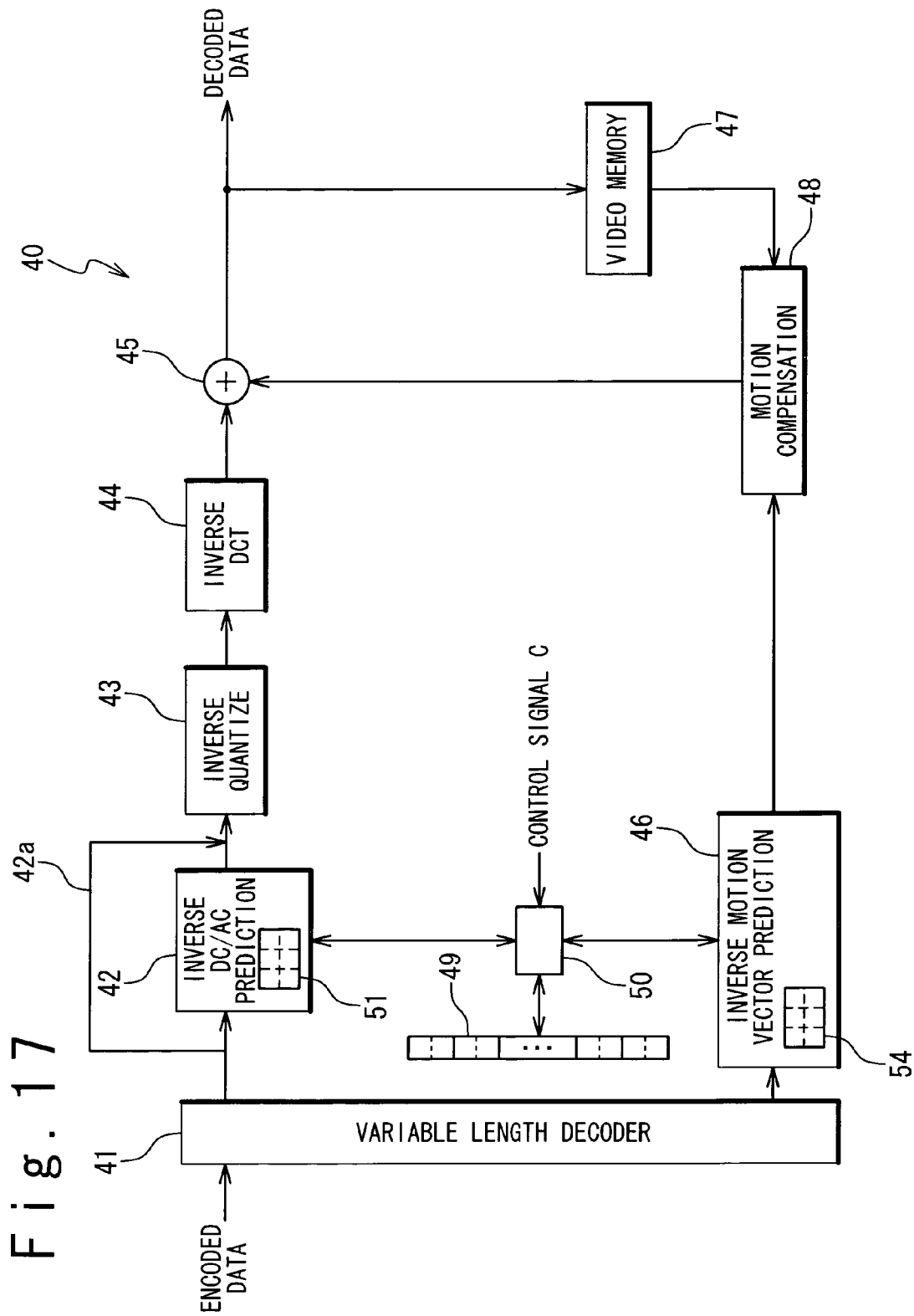

Fig. 18A
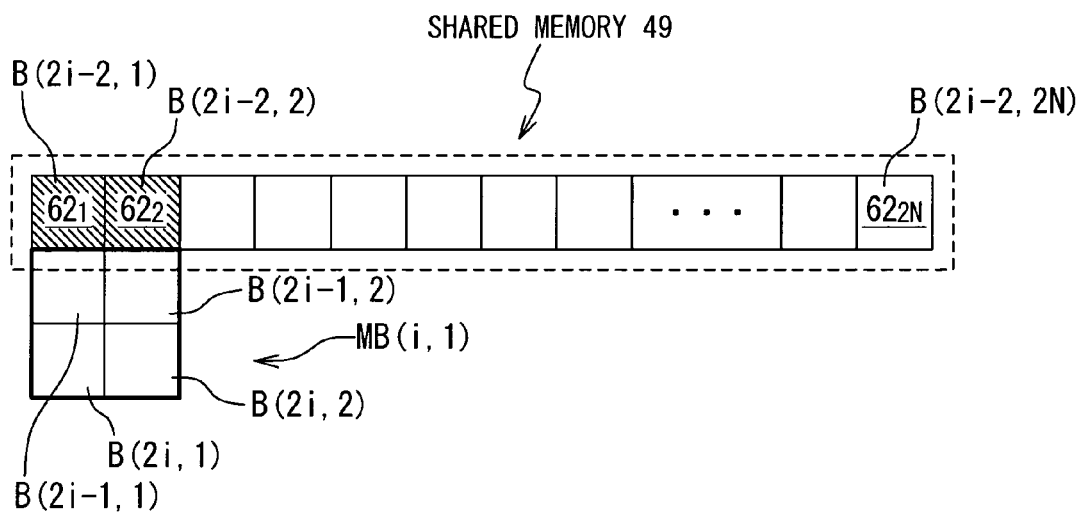
JUST BEFORE INVERSE DC/AC PREDICTION FOR MACRO BLOCK MB (i, 1)
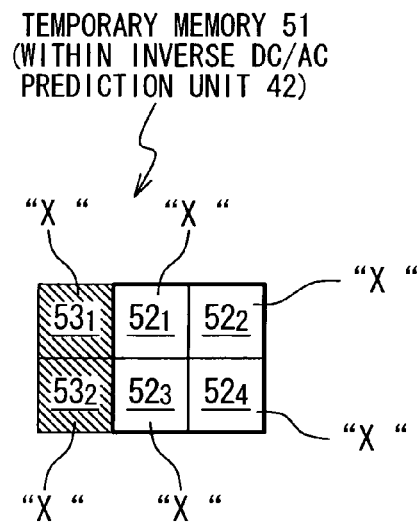
TEMPORARY MEMORY 51
(WITHIN INVERSE DC/AC
PREDICTION UNIT 42)
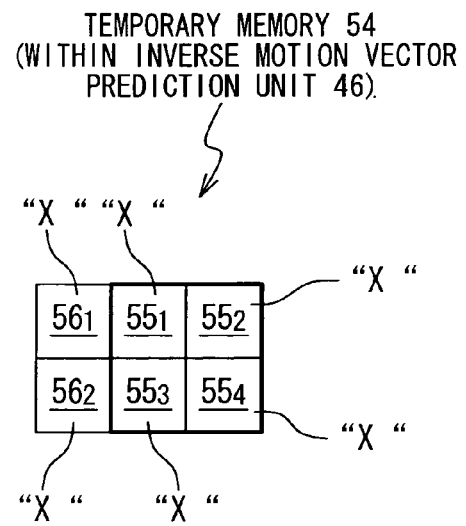
TEMPORARY MEMORY 54
(WITHIN INVERSE MOTION VECTOR
PREDICTION UNIT 46)

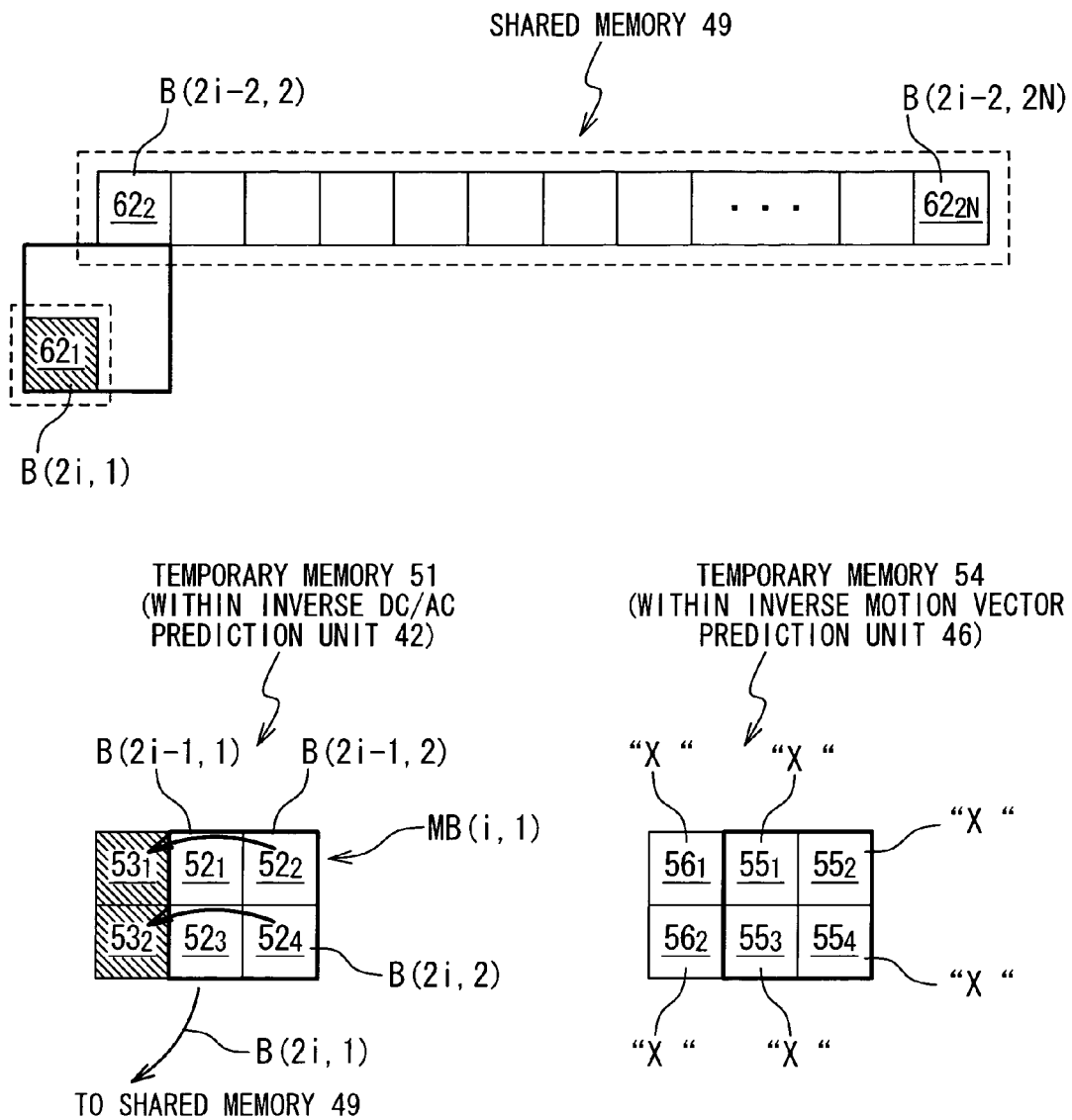

Fig. 19A
JUST BEFORE INVERSE MOTION VECTOR PREDICTION FOR MACRO BLOCK MB (i, 1)
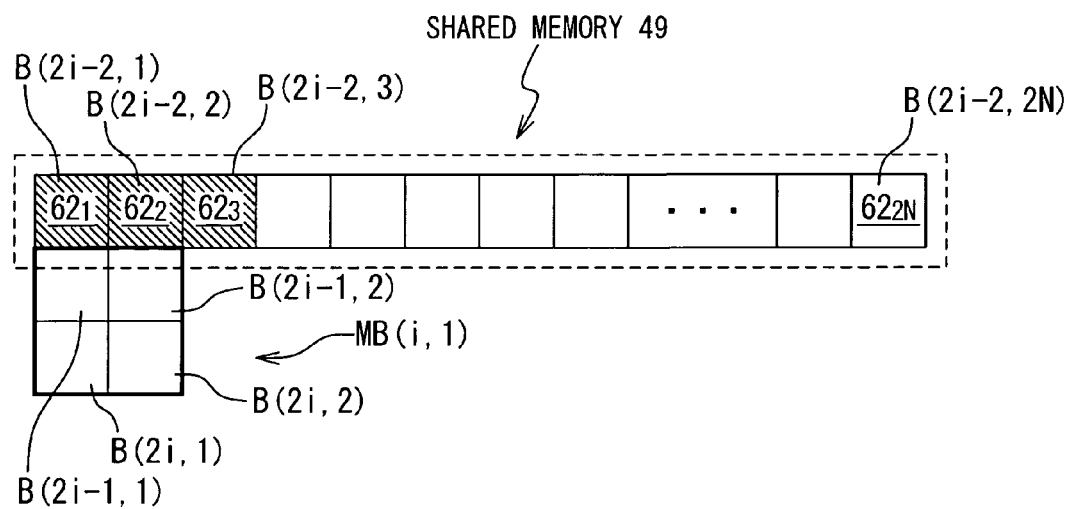
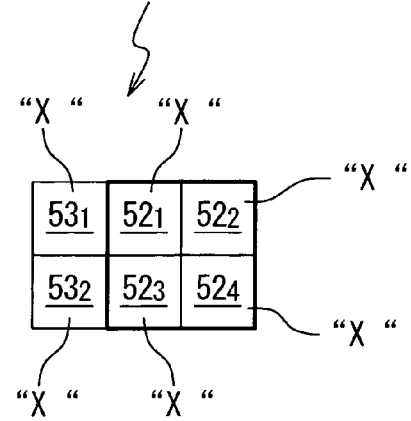
TEMPORARY MEMORY 51
(WITHIN INVERSE DC/AC
PREDICTION UNIT 42)
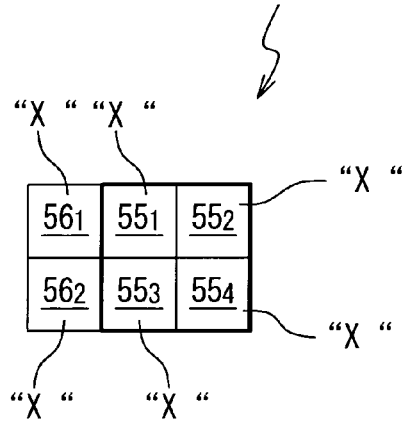
TEMPORARY MEMORY 54
(WITHIN INVERSE MOTION VECTOR
PREDICTION UNIT 46)

Fig. 20A
JUST BEFORE INVERSE DC/AC PREDICTION FOR MACRO BLOCK MB(i, j) (2≦j≦N-1)
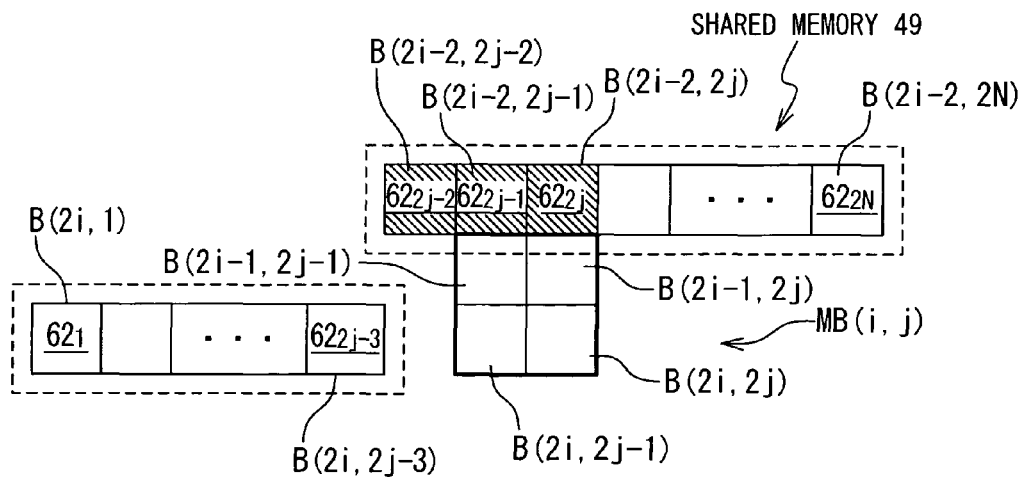
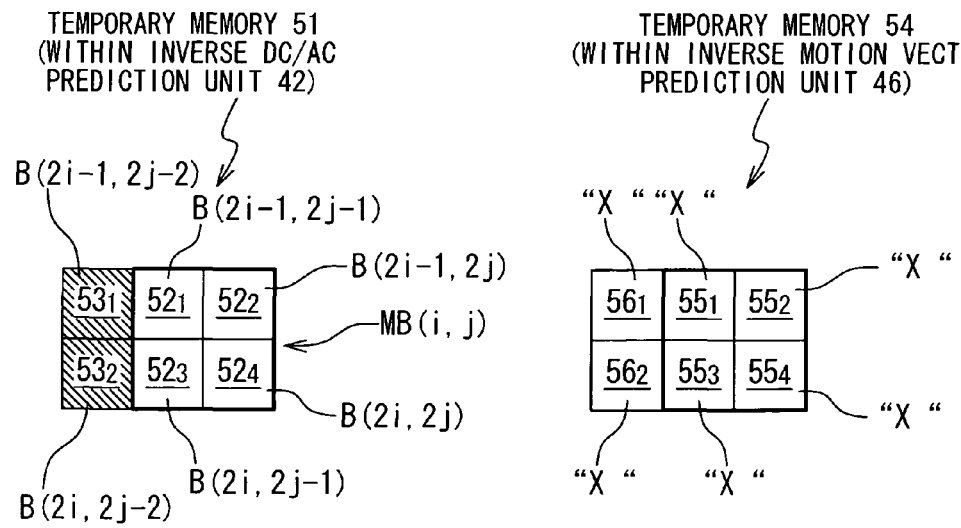

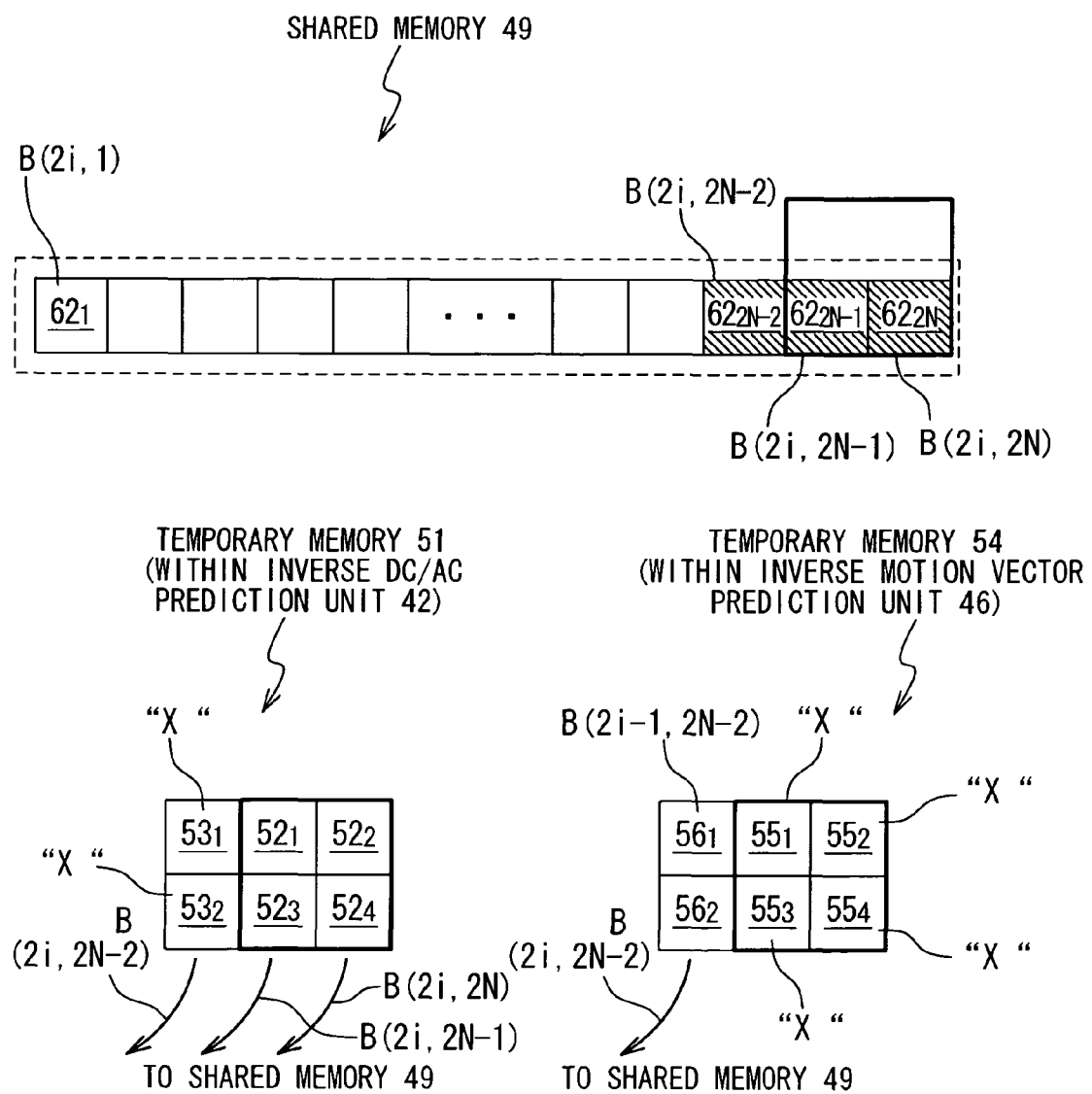

VIDEO ENCODER AND DECODER FOR ACHIEVING INTER-AND INTRA-FRAME PREDICTIONS WITH REDUCED MEMORY RESOURCE

BACKGROUND OF THE INVENTION

1. Field of the Invention

The present invention relates to video encoders and decoders. Particularly, the present invention relates to video encoders and decoders adapted to both of motion vector prediction and DC/AC prediction.

2. Description of the Related Art

Inter-frame and intra-frame predictions are two major video encoding techniques. The inter-frame prediction is a video encoding technique based on the similarities between consecutive frames in the video sequence. As long as there is no rapid change in a moving picture, many portions of the moving picture are almost unchanged between the consecutive frames. Therefore, an efficient video encoding can be achieved by selectively encoding the data representing changes in the consecutive frames. The motion estimation is a typical video encoding technique based on inter-frame prediction. The motion estimation involves calculating motion vectors, which are representative of the changes between the current and referenced frames, and encoding the motion vectors.

The intra-frame prediction, on the other hand, is a video encoding technique based on strong correlation between grayscale levels of adjacent pixels within a single frame. The discrete cosine translation (DCT) is a typical video encoding technique based on the intra-frame prediction.

Many video encoding techniques exploits both of the inter-frame and intra-frame predictions. For example, the MPEG4 SP (Moving Picture Experts Group 4 Simple Profile) encoding expresses a moving image with I-VOPs (Video Object Plane) generated by using only the intra-frame prediction, and P-VOPs generated by using the inter-frame prediction and the forward intra-frame prediction. Furthermore, the MPEG4 ASP (Advanced Simple Profile) encoding expresses moving images with B-VOP and S-VOP (sprite VOP) generated by using the bidirectional inter-frame prediction and the intra-frame prediction in addition to I-VOP and P-VOP. It should be noted that the MPEG4 specification refers to the video encoding based on the intra-frame prediction as the intra-mode encoding, and to the video encoding based on the inter-frame prediction as the inter-mode encoding.

The motion vector prediction is one of the video encoding techniques used in the inter-frame prediction. The motion vector prediction is a technique for further compressing the image by the differential encoding of the motion vectors calculated by the motion estimation.

On the other hand, the DC/AC prediction is one of the image encode techniques used in the intra-frame prediction. The DC/AC prediction is a technique that compresses an image by encoding a DC component and AC components of the image by differential encoding. When the DCT is used in the intra-frame prediction, a DC coefficient and AC coefficients calculated by the DCT are encoded by differential encoding.

The MPEG4 exploits both of the motion vector prediction and the DC/AC prediction. The following is a description of the procedures of the motion vector prediction and the DC/AC prediction, specified in the MPEG4.

The motion vector prediction and the DC/AC prediction specified in the MPEG4 are based on the fact that each frame has a 4:2:0 luminance format shown in FIG. 1. The MPEG4 4:2:0 luminance format divides one frame into macro blocks (MB) each composed of a luminance macro block of 16×16 pixels and two chrominance blocks of 8×8 pixels, and further divides each luminance macro block into four 8×8 pixel blocks arranged in two rows and two columns. When each frame is composed of 720×480 pixels, for example, the frame is each composed of luminance macro blocks arranged in 30 rows and 45 columns, in other words, composed of blocks arranged in 60 rows and 90 columns. A line of macro blocks arranged in the horizontal direction of the frame may be referred to as the macro block line, and a line of blocks arranged in a line in the horizontal direction may be referred to as the block line. The MPEG4 specifies that the motion vector prediction and the DC/AC prediction are performed in units of blocks.

FIGS. 2A to 2D are schematic views of the procedure of the motion vector prediction specified in the MPEG4. According to the MPEG4, the motion vector prediction of a current block within a current macro block is performed by referring to the motion vectors associated with three reference blocks; the current block is referred by a symbol "MV", and the reference blocks are referred by symbols "MV1", "MV2" and "MV3", respectively, in FIGS. 2A to 2D. The motion vector prediction specified in MPEG4 determines the median of the motion vectors associated with the three reference blocks, and defines the difference between the determine median and the motion vector of the current block as the motion vector difference.

The motion vector difference is accompanied by control data indicating which reference block is used for generating the motion vector difference (that is, indicating which referenced block is adopted as the median of the three referenced blocks). The control data is used to reproduce the original motion vector from the motion vector difference, that is, to perform the inverse vector prediction. The inverse vector prediction is achieved by adding the motion vector difference to the motion vector of the reference block indicated by the control data.

The relative positioning between the current block and the reference blocks is different according to the position of the current block within the current macro block. As shown in FIG. 2A, when the current block MV is located on the upper left of the current macro block, a block MV1 adjacent to the left of the current block MV, a block MV2 adjacent to the top of the current block MV, and a block MV3 located away from the block MV2 by two blocks on the right are used as the reference blocks. When the current block MV is located on the upper right of the current macro block, as shown in FIG. 2B, a block MV1 adjacent to the left of the current block MV, a block MV2 adjacent to the top of the current block MV, and a block MV3 adjacent to the right of the block MV2 are used as the reference blocks. When the current block MV is located on the lower left of the current macro block, as shown in FIG. 2C, a block MV1 adjacent to the left of the current block MV, a block MV2 adjacent to the top of the current block MV, and a block MV3 adjacent to the right of the block MV2 are used as the reference blocks. Finally, when the current block MV is located on the lower right of the macro block, as shown in FIG. 2D, a block MV1 adjacent to the left of the current block MV, a block MV2 adjacent to the top of the block MV1, and a block MV3 adjacent to the top of the current block MV are used as the reference blocks.

It should be noted that, when a specific block to which the motion vector is not given is selected as one of the reference blocks, the motion vector prediction for the current block MV excludes the specific block in the determination of the motion vector difference. Referring to FIG. 2A, for example, the difference motion vector associated with the current block MV is calculated from only the motion vectors of the reference blocks MV2 and MV3, when the motion vector is not calculated for the reference block MV1. Such situation may occur, when the macro block adjacent to the current macro block is encoded by the intra-mode encoding, or when the current macro block is located on the left end of the frame.

As understood from FIGS. 2A to 2D, the motion vector prediction for four blocks within a current macro block requires motion vectors of five blocks around the current macro block located in the position shown in FIG. 2E (that is, two blocks arranged on the left of the current macro block and three blocks on the block line adjacent to the top of the current macro block), in addition to the motion vectors of the four blocks of the current macro block. The motion vector prediction requires temporarily storing the motion vectors of the above-described five blocks in a work area.

Correspondingly, inverse motion vector prediction for a current macro block requires storing previously-reproduced motion vectors of the reference blocks associated with the respective current blocks within the current macro block, in a work area. The inverse vector prediction to the current macro block requires temporarily storing the previously-reproduced motion vectors of the five blocks in the work area, since the reference blocks are selected from the above-described five blocks.

On the other hand, FIGS. 3A to 3D are schematic views of the procedure of the DC/AC prediction specified in the MPEG4. According to the MPEG4, the DC/AC prediction of a current block of n current macro block is performed by referring to DC and AC coefficients associated with three reference blocks. In the DC/AC prediction, differently from the motion vector prediction, the relative positions between the current block and the three reference blocks is not dependent on the position of the current block within the macro block. As shown in FIGS. 3A to 3D, a block A adjacent to the left of the current block X, a block B adjacent to the top of the block A, and a block C adjacent to the top of the current block X are used as the reference blocks in the DC/AC prediction for the current block X, regardless of the position of the current block X within the current macro block.

The block used for calculating DC and AC coefficient difference data for the current-block is selected from the reference blocks A and C on the basis of the DC coefficients calculated for the reference blocks A, B and C. The difference between the DC coefficients of the selected block and the current block X is determined as the DC coefficient difference data associated with the current block X, the respective differences between the AC coefficients of the selected block and the current block X are determined as the AC coefficient difference data.

It should be noted that, when a certain block to which DC and AC coefficients are not given is selected as one of the reference blocks, the DC/AC prediction for the current block X excludes the certain block in the determination of the DC and AC coefficient difference data. Referring to FIG. 3A, when the DC coefficient and the AC coefficients are not given to the reference block B, for example, the DC and AC coefficient difference data associated with the current block X are calculated from the DC coefficients and the AC coefficients of only the reference blocks A and C. Such situation may occur, when the macro block adjacent to the current macro block is encoded by the inter-mode encoding or when the current macro block is located on the left end of the image.

The calculated DC and AC coefficient difference data are attached with control data indicating which reference block is used for calculating the DC and AC coefficient difference data. The control data is used to perform inverse DC/AC prediction for reproducing the original DC and AC coefficients from the DC and AC coefficient difference data. The inverse DC/AC prediction is achieved by adding the DC and AC coefficient difference data to the DC and AC coefficients of the reference block indicated by the control data, respectively.

As understood from FIGS. 3A to 3D, the DC/AC prediction for four blocks within an current macro block requires the sets of DC and. AC coefficients associated with five blocks around the current macro block located in the position shown in FIG. 3E (that is, two blocks arranged on the left of the current macro block and three blocks of the block line adjacent to the top the current macro block), in addition to the set of the DC and AC coefficients of four blocks within the current macro block. The AC/DC prediction requires temporarily storing the DC and AC coefficients of the above-described five blocks in a work area.

Correspondingly, inverse DC/AC prediction for a current macro block requires storing the previously-reproduced DC/AC coefficients of the reference blocks associated with the respective current blocks included within the current macro block, in the work area. The inverse DC/AC prediction for the current macro block requires temporarily store the DC and AC coefficients reproduced for the five blocks in the work area, since the reference blocks are selected from the above-described five blocks.

One of the important requirements imposed on a video encoder and decoder is to achieving encoding and decoding of moving images with reduced hardware, especially in terms of the capacity of a memory used as a work area in the encoding and decoding. It is important for manufacturers of video encoders and decoders to develop efficient hardware implementations, since many video encoding specifications, such the MPEG4 specification do not specify hardware implementations for encoding and decoding.

Japanese Laid-Open Patent Application No. 2004-274411A, for example, discloses a technique for reducing the capacity of a motion vector memory used as a work area of the motion vector prediction down to the capacity corresponding to the data size of motion vectors associated with only one macro block line. In this technique, the capacity of the motion vector memory is reducing by appropriately transferring motion vectors within the motion vector memory.

Additionally, Japanese Laid-Open Patent Application No. 2002-118853A discloses a video decoder for reducing the capacity of a memory area for storing the referenced DC/AC coefficients for the DC/AC prediction, down to the capacity corresponding to the data size necessary for the DC/AC prediction of one macro block line. In this technique, the capacity of the memory area is reduced by copying the reproduced DC and AC coefficients to a line storage portion.

However, the prior arts suffer from a problem that the overall capacity of the memory area required for achieving both of the motion vector prediction and the DC/AC prediction is not sufficiently reduced. The prior arts also suffer from a problem that the overall capacity of the memory area required for the inverse motion vector prediction and the inverse DC/AC prediction is not sufficiently reduced. Even when both of the above-described two prior arts are used, the overall capacity of the memory area required for the motion vector prediction and the DC/AC prediction is reduced only down to the capacity required for the predictions of two macro block lines. The same applies to the inverse motion vector prediction and the inverse DC/AC prediction.

SUMMARY OF THE INVENTION

In order to solve the above-described problem, the present invention exploits the fact that the DC/AC prediction and the vector prediction are exclusively performed for each macro block. Specifically, a video encoder according to the present invention is designed to use a single memory as a work area for both of the DC/AC prediction and the vector prediction, and thereby reduces the capacity of the memory region required for performing these predictions. Correspondingly, a video decoder according to the present invention is designed to use a single memory as a work area for both of the inverse DC/AC prediction and the inverse vector prediction, and thereby reduces the capacity of the memory region required for performing these inverse predictions.

More specifically, in an aspect of the present invention, a video encoder is composed of a DC/AC prediction unit performing DC/AC prediction; a motion vector prediction unit performing motion vector prediction; and a memory accessible from both of the DC/AC prediction unit and the motion vector prediction unit.

In a preferred embodiment, the DC/AC prediction unit is configured to store DC and AC coefficients in the memory, and to calculate DC and AC coefficient difference data from the stored DC and AC coefficients, while the motion vector prediction unit is configured to store a motion vector in the memory, and to calculate a motion vector difference from the stored motion vectors.

The video encoder thus designed effectively reduces the size of the memory necessary for performing both of the motion vector prediction and the DC/AC prediction.

In another aspect of the present invention, a video decoder is composed of an inverse DC/AC prediction unit performing inverse DC/AC prediction; an inverse motion vector prediction unit performing inverse motion vector prediction; and a memory accessible from both of the inverse DC/AC prediction unit and the inverse motion vector prediction unit.

In a preferred embodiment, the inverse DC/AC prediction unit is configured to receive first DC and AC coefficients stored in the memory and DC and AC coefficient difference data, to reproduce second DC and AC coefficients from the first DC and AC coefficient difference data and the DC and AC coefficient difference data, and to store the reproduced second DC and AC coefficients in the memory, while the inverse motion vector prediction unit is configured to receive a first motion vector stored in the memory and a motion vector difference, to reproduce a second motion vector from the first motion vector and the motion vector difference, and to store the reproduced second motion vector in the memory.

The video decoder thus designed effectively reduces the size of the memory necessary for performing both of the inverse motion vector prediction and the inverse DC/AC prediction.

BRIEF DESCRIPTION OF THE DRAWINGS

The above and other advantages and features of the present invention will be more apparent from the following description taken in conjunction with the accompanied drawings, in which:

FIG. 1 shows the format of image frames specified by the MPEG4 specification;

FIG. 4 illustrates a format of a moving image processed by a video encoder and decoder in one embodiment of the present invention;

FIGS. 10A and 10B are conceptual views illustrating an exemplary procedure of the DC/AC prediction for a leftmost macro block MB (i, 1);

FIGS. 11A and 11B are conceptual views illustrating an exemplary procedure of the motion vector prediction for the leftmost macro block MB (i, 1);

FIGS. 12A and 12B are conceptual views illustrating an exemplary-procedure of the DC/AC prediction for an intermediate macro block MB (i, j);

FIGS. 14A and 14B are conceptual views illustrating an exemplary procedure of the DC/AC prediction for a rightmost macro block MB (i, N);

FIGS. 15A and 15B are conceptual views illustrating an exemplary procedure of the motion vector prediction for the rightmost macro block MB (i, N);

FIG. 17 is a block diagram illustrating an exemplary structure of a video decoder in this embodiment;

FIGS. 18A and 18B are conceptual views illustrating an exemplary procedure of the inverse DC/AC prediction to a leftmost macro block MB (i, 1);

FIGS. 19A and 19B are conceptual views illustrating an exemplary procedure of the inverse motion vector prediction for the leftmost macro block MB (i, 1);

FIGS. 20A and 20B are conceptual views illustrating an exemplary procedure of the inverse DC/AC prediction for an intermediate macro block MB (i, j);

FIGS. 22A and 22B are conceptual views illustrating an exemplary procedure of the inverse DC/AC prediction for a rightmost macro block MB (i, N)

DESCRIPTION OF THE PREFERRED EMBODIMENTS

The invention will be now described herein with reference to illustrative embodiments. Those skilled in the art would recognize that many alternative embodiments can be accomplished using the teachings of the present invention and that the invention is not limited to the embodiments illustrated for explanatory purposed.

Moving Picture Format

Figure 5:
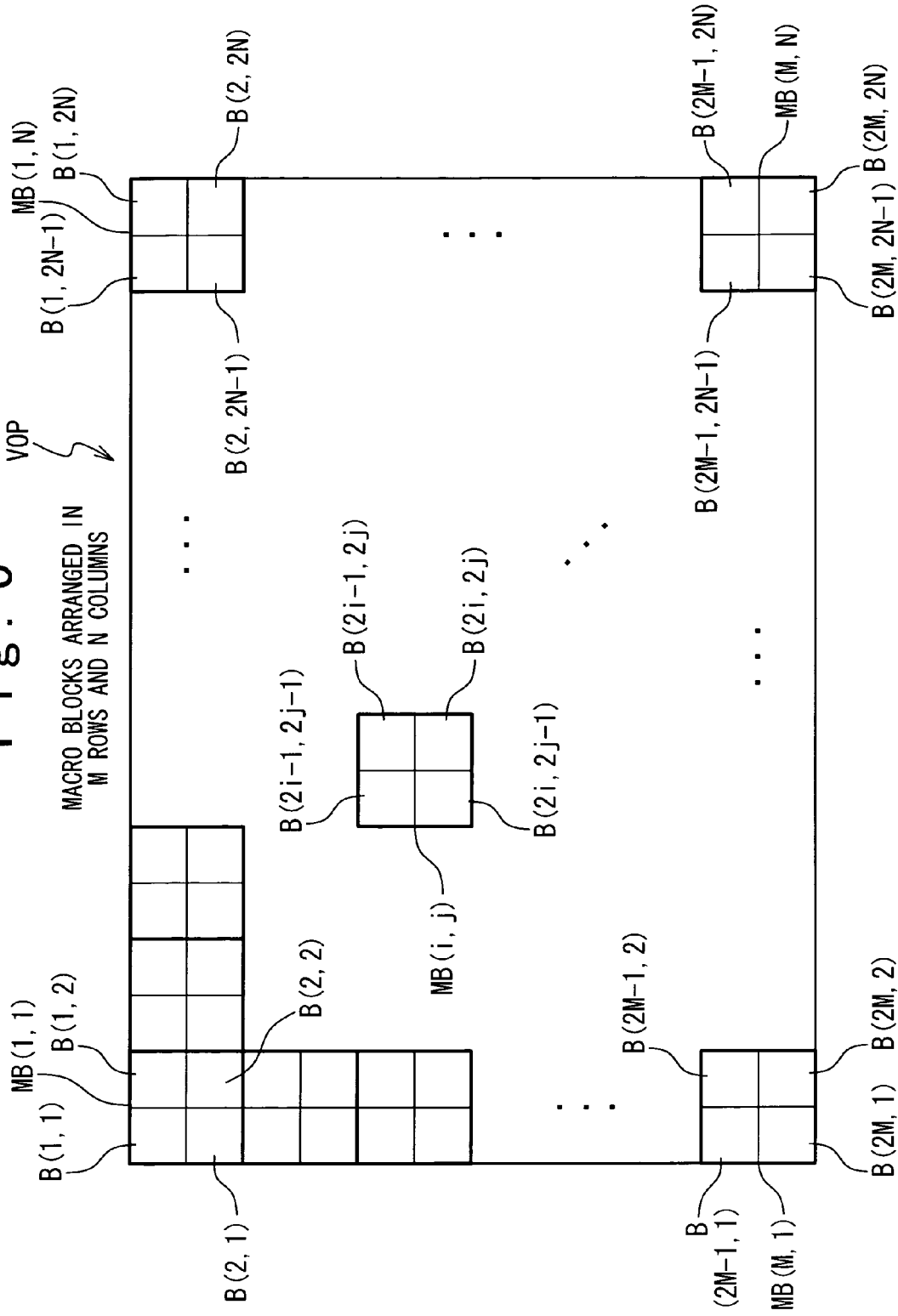
FIG. 5 is a conceptual view illustrating a format of each image frame of a moving image in this embodiment.

FIGS. 4 and 5 illustrate a format of video data to be processed by a video encoder and decoder in one embodiment of the present invention. The video encoder and decoder described in this embodiment are designed to support the format of the moving image specified by the MPEG4 SP specification. As shown in FIG. 4, a moving image in accordance with the MPEG4 SP specification is composed of a set of VOPs.

As shown in FIG. 5, each VOP is composed of luminance macro blocks arranged in M rows and N columns, and each luminance macro block is further divided into blocks arranged in two rows and two columns; this implies that the image frame to be processed is divided into blocks of 2M rows and 2N columns. As described above, each luminance macro block is composed of 16×16 pixels, and each block is composed of 8×8 pixels.

Hereinafter, the luminance macro block positioned in the i-th row and the j-th column is referred to as the macro block MB (i, j). Furthermore, the block positioned in the p-th row and the q-th column is referred to as the block B(p, q). According to such notational expression, the macro block MB(i, j) is composed of four blocks B($2i-1$, $2j-1$), B($2i-1$, $2j$), B($2i$, $2j-1$) and B($2i$, $2j$) Referring back to FIG. 4, the VOPs within the moving image includes two kinds of VOPs: I-VOPs and P-VOPs, in accordance with the MPEG4 SP specification. The I-VOPs are generated by using only the intra-mode encoding (that is, by using only the intra-frame prediction), and the P-VOPs are generated by using both the intra-mode and inter-mode encodings (that is, by using both intra-frame and forward inter-frame predictions). Each macro block within the P-VOPs is encoded in an encoding mode selected out of the intra-mode and the inter-mode. As described later, the macro block encoded by the intra-mode encoding is subjected to DCT, quantization, DA/AC prediction and variable-length encoding. On the other hand, the macro block encoded by the intra-mode encoding is subjected to motion compensation, motion vector prediction, and variable-length encoding.

Video Encoder

1. Overall Structure and Operation of Video Encoder

Figure 6:
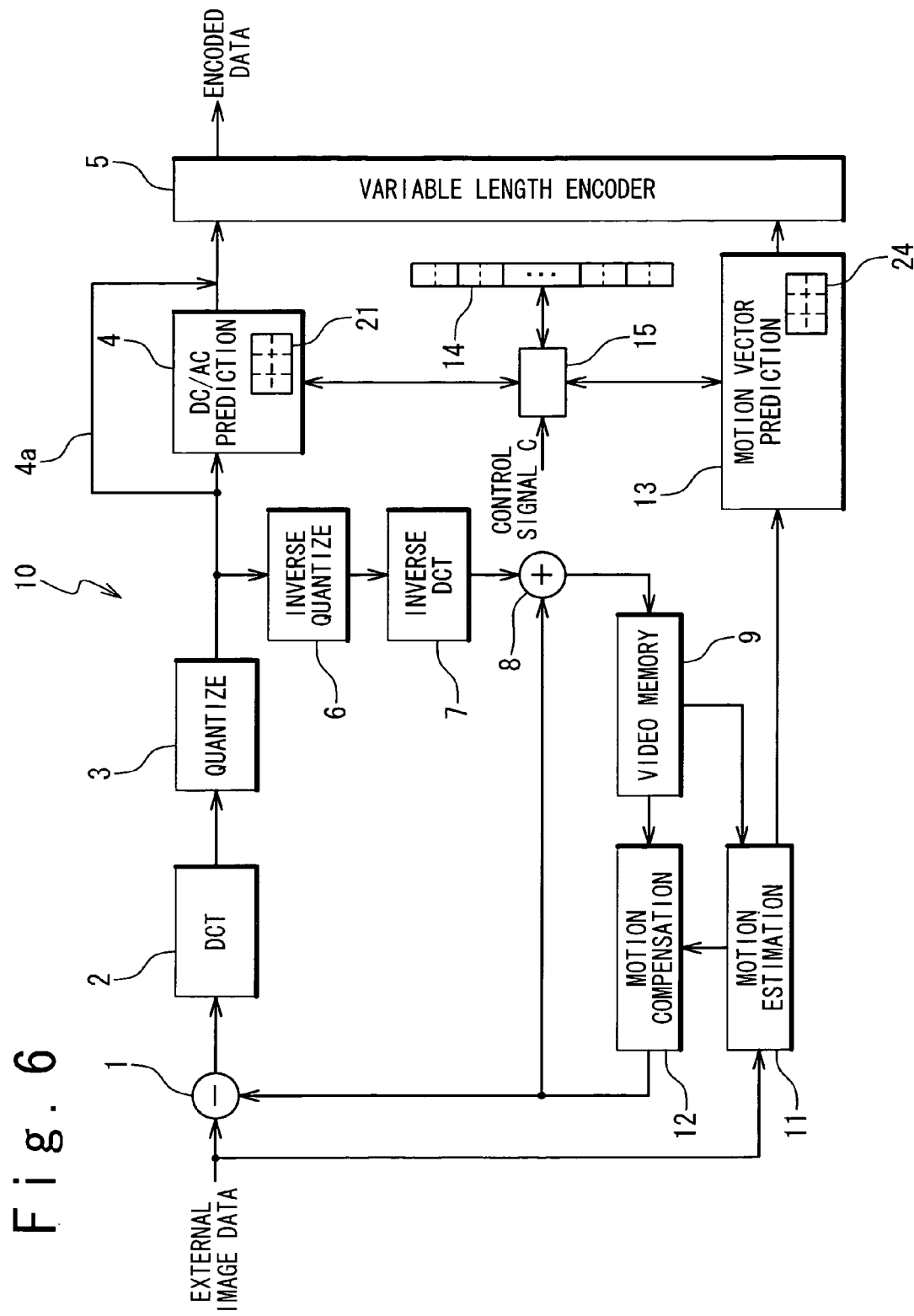
FIG. 6 is a block diagram illustrating an exemplary structure of a video encoder in this embodiment.

FIG. 6 is a block diagram illustrating an exemplary structure of a video encoder 10 in one embodiment of the present invention. The video encoder 10 is designed to support the video encoding based on the MPEG4 SP specification. Specifically, the video encoder 10 is provided with a subtracter 1, a DCT processing unit 2, a quantizer 3, a DC/AC prediction unit 4, a variable-length encoder 5, an inverse quantizer 6, an inverse DCT processing unit 7, an adder 8, a video memory 9, a motion estimation unit 11, a motion compensation unit 12 and a motion vector prediction unit 13.

The subtracter 1 is configured to calculate differences between externally-inputted video data and motion-compensated video data received from the motion compensation unit 12. The operation of the subtracter 1 depends on the compression mode of the current macro block. When the current macro block is a macro block to be encoded by the intra-mode encoding, the subtracter 1 outputs the externally-inputted video data to the DCT processing unit 2 as they are. On the other hand, when the current macro block is a macro block to be encoded by the inter-mode encoding, the subtracter 1 outputs differences between the externally input video data and the motion-compensated video data to the DCT processing unit 2.

The DCT processing unit 2 applies discrete cosine transform (DCT) to the video data received from the subtracter 1 to calculate DC and AC coefficients, and provides the DC and AC coefficients for the quantizer 3.

The quantizer 3 quantizes the DC and AC coefficients. The quantized DC and AC coefficients are sent to the DC/AC prediction unit 4 and the inverse quantizer 6.

The DC/AC prediction unit 4 performs the DC/AC prediction specified in the MPEG4 specification for the quantized DC and AC coefficients received from the quantizer 3 to calculate DC and AC coefficient difference data. The DC/AC prediction unit 4 is provided with a temporary memory 21, and uses the temporary memory 21 to perform the DC/AC prediction. The DC and AC coefficient difference data calculated by the DC/AC prediction are sent to the variable-length encoder 5. A data through path 4a for bypassing the DC/AC prediction unit 4 is additionally provided in the video encoder 10. The data through path 4a is used when the DC/AC prediction is not performed (that is, when the current macro block is encoded by the inter-mode encoding).

The inverse quantizer 6, the inverse DCT processing unit 7, the adder 8, the video memory 9, the motion estimation unit 11, and the motion compensation unit 12 are a set of circuits for performing the motion compensation. The inverse quantizer 6 performs inverse quantization on the quantized DC and AC coefficients received from the quantizer 3. The inverse DCT processing unit 7 applies the inverse discrete cosine transform to the inverse-quantized DC and AC coefficients and thereby reproduces video data. The adder 8 adds the video data received from the motion compensation unit 12 to the video data received from the inverse DCT processing unit 7, and thereby generates reference video data to be referred in the motion compensation. The video memory 9 stores the reference video data received from the adder 8. The motion estimation unit 11 calculates motion vectors by performing motion estimation between the externally-inputted video data and the reference video data stored in the video memory 9. The motion vectors calculated by the motion estimation unit 11 are sent to the motion compensation unit 12 and the motion vector prediction unit 13. The motion compensation unit 12 performs motion compensation for the reference image stored in the video memory 9 using the motion vectors calculated by the motion estimation unit 11, and generates motion-compensated video data. The motion-compensated video data are supplied to the subtracter 1 and the adder 8.

The motion vector prediction unit 13 successively performs motion vector prediction for the motion vectors calculated by the motion estimation unit 11 to generate motion vector differences. The motion vector prediction unit 13 is provided with a temporary memory 24, and uses the temporary memory 24 to perform the motion vector prediction. The difference motion vector calculated by the motion vector prediction is sent to the variable-length encoder 5.

The variable-length encoder 5 performs variable-length encoding on the DC and AC coefficient difference data received from the DC/AC prediction unit 4 and the motion vector differences received from the motion vector prediction unit 13 to finally generate encoded data.

Figure 2A:
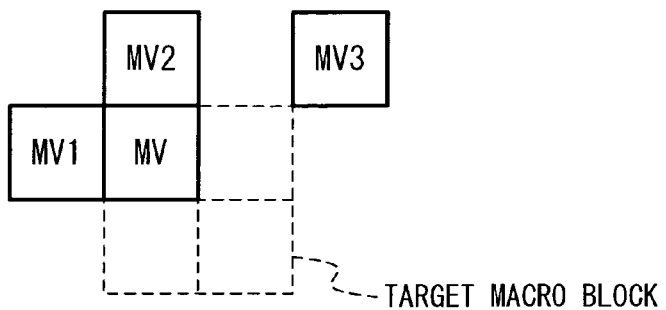
FIGS. 2A to 2D are conceptual views explaining the motion vector prediction specified in the MPEG4 specification.
Figure 2B:
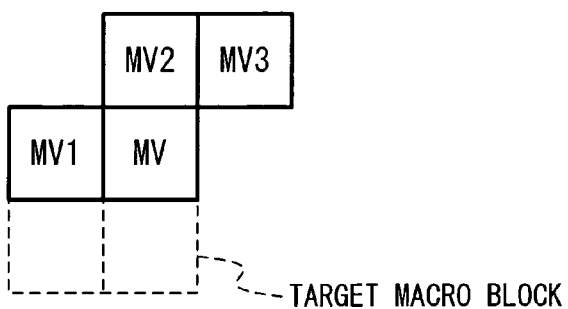
Figure 2C:
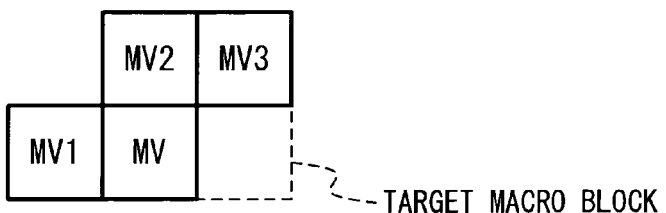
Figure 2D:
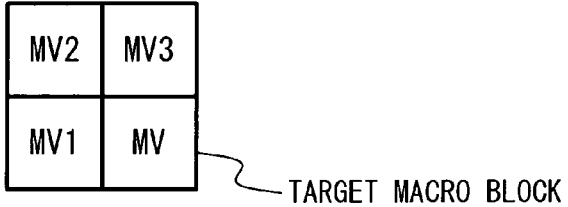
Figure 2E:
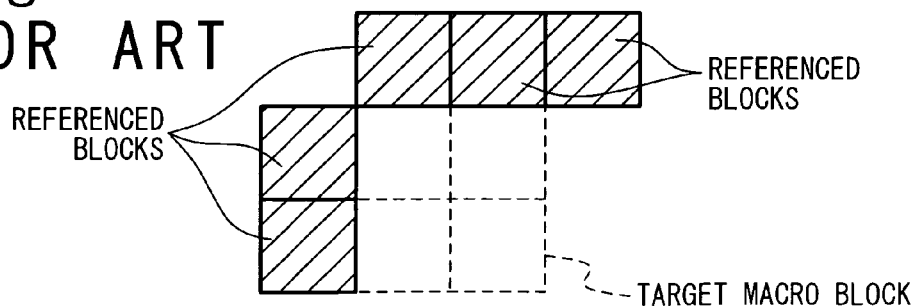
FIG. 2E illustrates blocks around a current macro block, from which reference blocks are selected in the motion vector prediction processing for the current macro block.
Figure 3A:
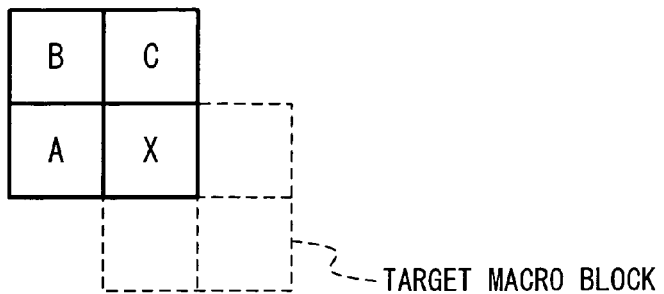
FIGS. 3A to 3D are conceptual views explaining the DC/AC prediction specified in the MPEG4 specification.
Figure 3B:
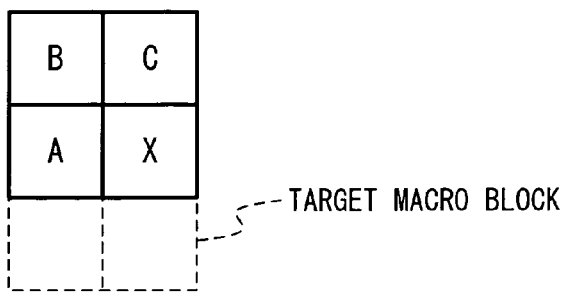
Figure 3C:
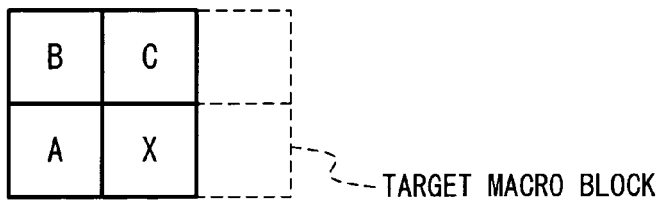
Figure 3D:
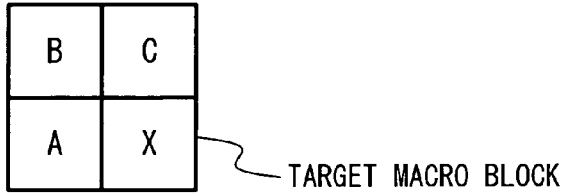
Figure 3E:
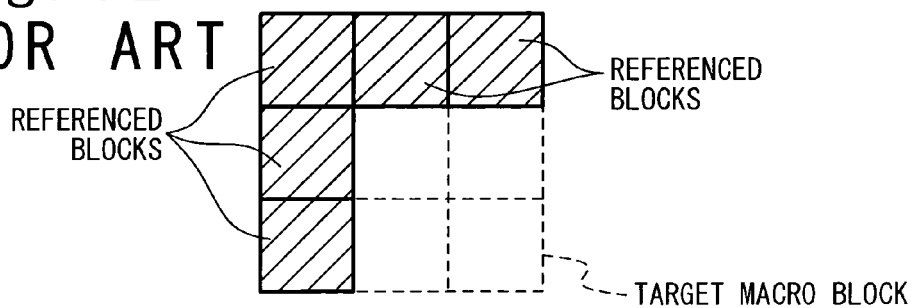
FIG. 3E illustrates blocks around a current macro block, from which reference blocks are selected in the DC/AC prediction processing for the current macro block.

The video encoder 10 is additionally provided with a shared memory 14 accessible from both of the DC/AC prediction unit 4 and the motion vector prediction unit 13. The shared memory 14 is a work area used for storing the DC and AC coefficients and motion vectors associated with blocks positioned in the block line adjacent to the top of the current macro block; the DC/AC prediction unit 4 and the vector predictor 13 share the shared memory 14 as the work area. It should be noted that the DC and AC coefficients and the motion vectors of the blocks in the block line adjacent to the top of the current macro block are used for the DC/AC prediction and the motion vector prediction, as shown in FIGS. 2E and 3E.

More specifically, the DC/AC prediction unit 4 and the motion vector prediction unit 13 are connected to the shared memory 14 via a selector 15. The selector 15 selects one of the DC/AC prediction unit 4 and the motion vector prediction unit 13 in response to a control signal C, and the selected predictor is connected to the shared memory 14. As described later, it is important that the DC/AC prediction unit 4 and the motion vector prediction unit 13 share the shared memory 14 as a work memory, for achieving the reduction in the total capacity of the necessary memory area.

The operation of the video encoder 10 depends on the compression mode of the current macro block. When the current macro block is encoded by the intra-mode encoding, the video data of the current-macro block is subjected to the DCT, the quantization, the DA/AC prediction and the variable-length encoding. In detail, the subtracter 1 outputs the externally-inputted video data of the current macro block to the DCT processing unit 2 as they are, disregarding the output of the motion compensation unit 12. The discrete cosine transform is performed on the externally inputted video data by the DCT processing unit 2, and the quantization is then performed by the quantizer 3. The DC/AC prediction is then performed by the DC/AC prediction unit 4, and the variable-length encoding is finally performed by the variable-length encoder 5. The output of the variable-length encoder 5 is the desired encoded data.

On the other hand, when the current macro block is encoded by the inter-mode encoding, the video data of the current macro block is subjected to the motion estimation, the motion vector prediction, and the variable-length encoding. More specifically, the DCT and the quantization are performed on the output of the subtracter 1 by the DCT processing unit 2 and the quantizer 3, respectively, and the quantized video data is sent to the variable-length encoder 5 via the data through path 4a. The reference video data is then generated from the video data outputted from the quantizer 3 by the inverse quantizer 6, the inverse DCT processing unit 7, the adder 8 and the motion compensation unit 12, and the generated reference video data is stored in the video memory 9. Further; the motion vector is calculated by the motion estimation unit 11 from the reference video data stored in the video memory 9, and the externally-inputted video data. The motion vector prediction is then performed on the calculated motion vector by the motion vector prediction unit 13 to calculate the motion vector difference. The variable-length encoding of the video data outputted from the quantizer 3 and difference motion vector is finally performed by the variable-length encoder 5. The output of the variable-length encoder 5 is the desired encoded data.

One of the important features of the video encoder 10 in this embodiment is that the video encoder 10 is provided with the shared memory 14 accessible from both of the DC/AC prediction unit 4 and the motion vector prediction unit 13. This effectively reduces the overall capacity of the memory area used by the DC/AC prediction unit 4 and the motion vector prediction unit 13 for the DC/AC prediction and the motion vector prediction (that is., the sum of the capacities of the shared memory 14, the temporary memory 21 loaded on the DC/AC prediction unit 4 and the temporary memory 24 of the motion vector prediction unit 13).

In detail, the video encoder 10 in this embodiment adopts architecture in which the data of a block line adjacent to the top of the current macro block are stored in the shared memory 14, and the data of the current macro block and the data of two blocks adjacent to the left of the current macro block are stored in the temporary memories 21 and 24 of the DC/AC prediction unit 4 and the motion vector prediction unit 13. The video encoder 10 in this embodiment effectively achieves reduces the capacity of the total memory area used for the DC/AC prediction and the motion vector prediction by adopting such architecture and by optimizing data transfer between the shared memory 14 and the temporary memories 21 and 24.

2. Structures of Shared Memory and Temporary Memories, and DC/AC Prediction and Motion Vector Prediction Using the Same)

(1) Structures of Shared Memory and Temporary Memories

Figure 7:
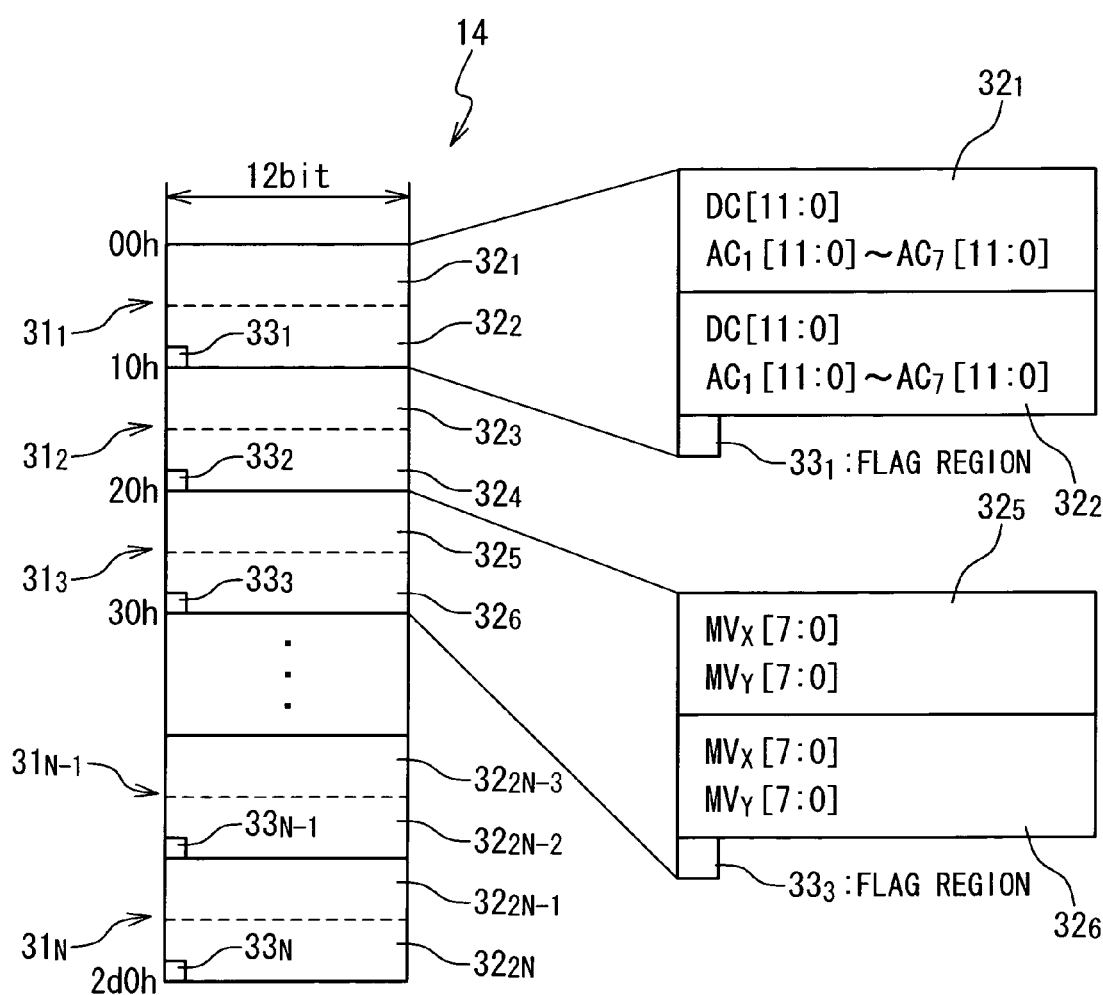
FIG. 7 is a conceptual view illustrating a memory map of a shared memory within the video encoder in this embodiment.

FIG. 7 illustrates a memory map of the shared memory 14, which is commonly used by the DC/AC prediction unit 4 and the motion vector prediction unit 13. As described above, the shared memory 14 is designed to store the DC and AC coefficients and motion vectors associated with one block line.

More specifically, the shared memory 14 is provided with N memory areas $31_1$ to $31_N$ respectively associated with macro blocks; it should be noted that the number of memory areas $31_1$ to $31_N$ is the same as that of the macro blocks within one macro block line. Each memory area $31_j$ is associated with a macro block located in the j-th column.

The memory areas $31_1$ to $31_N$ are each provided with two memory blocks 32 and a flag area 33. Hereinafter, two memory blocks 32 within the memory area $31_j$ are referred to as the memory block $32_{2j-1}$ and $32_{2j}$, and the flag area 33 within the memory area $31_j$ is referred to as the flag area $33_j$. In other words, the shared memory 14 is provided with memory blocks $32_1$ to $32_{2N}$ and flag areas $33_1$ to $33_N$.

The memory blocks $32_1$ to $32_{2N}$ are respectively associated with blocks, and are used for storing the DC coefficient and the AC coefficients (after being quantized) or the motion vector, calculated for the associated blocks. It should be noted that the number of the memory blocks 32 is 2N, which is same as the number of the blocks within one block line.

More specifically, when the memory area $31_j$ is associated with a macro block encoded by the intra-mode encoding, the DC and AC coefficients of the lower two blocks within the associated macro block are stored in the two memory blocks $32_{2j-1}$ and $32_{2j}$ within the memory area $31_j$. In the example of FIG. 7, the DC coefficient (DC [11:0]) and AC coefficients ($AC_1$ [11:0] to $AC_7$ [11:0]) of the associated blocks are stored in the memory blocks $32_1$ and $32_2$. The DC and AC coefficients are each 12-bit data.

On the other hand, when the memory area $31_j$ is associated with a macro block encoded by the inter-mode encoding, the motion vectors of the lower two blocks within the associated macro block are stored in the two memory blocks $32_{2j-1}$ and $32_{2j}$ within the memory area $31_j$; in example of FIG. 7, motion vector data $MV_X[7:0]$ and $MV_Y[7:0]$ of the associated blocks are stored in the memory blocks $32_5$ and $32_5$; the motion vector data $MV_X[7:0]$ denotes the x-component of the motion vector, and the motion vector data $MV_Y[7:0]$ is the y-component of the motion vector. The motion vector $MV_X[7:0]$ and $MV_Y[7:0]$ are respectively data of 8 bits.

Each memory block 32 has the memory capacity for only storing the DC and AC coefficients of the associated one block. When each memory block 32 has such capacity, each memory block 32 can store the motion vector of the associated block. The capacity required for storing the motion vector calculated for one block is smaller than the capacity required for storing the DC and AC coefficients calculated for one block.

Invalid data may be stored in each memory block 32 instead. The invalid data designate data which are not indicative of the DC and AC coefficients or the motion vector. The invalid data are disregarded in the DC/AC prediction and the motion vector prediction. For example, when the DC/AC prediction and the motion vector prediction are performed for the uppermost macro block line, the invalid data are written in all of the memory blocks $32_1$ to $32_{2N}$.

Each flag area 33A stores a flag indicative of the kind of the data stored therein. The flag stored in each flag area 33 indicates which data is stored in the data stored in the each memory block 32, out of the DC and AC coefficients, the motion vector, or the invalid data.

As described above, the temporary memory 21, incorporated in the DC/AC prediction unit 4, is used for the DC/AC prediction in addition to the shared memory 14. The temporary memory 21 stores the DC and AC coefficients of the four blocks within the current macro block and the two blocks adjacent to the left of the current macro block. As understood from FIG. 3E, the DC and AC coefficients of the two blocks adjacent to the left of the current macro block are required for the DC/AC prediction.

Figure 8:
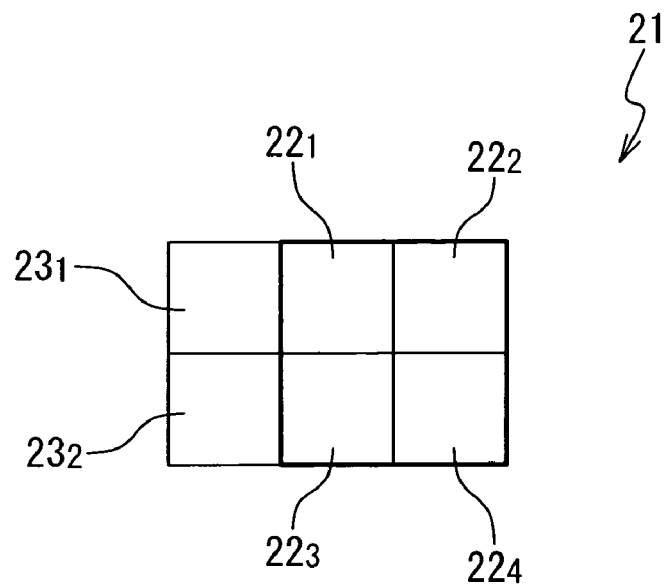
FIG. 8 is a conceptual view illustrating an exemplary structure of a temporary memory of a DC/AC prediction unit within the video encoder in this embodiment.

FIG. 8 is a block diagram illustrating an exemplary structure of the temporary memory 21. The temporary memory 21 is provided with six memory blocks: object memory blocks $22_1$ to $22_4$ and reference memory blocks $23_1$ and $23_2$, each designed to store the DC and AC coefficients for one block. The object memory blocks $22_1$, $22_2$, $22_3$ and $22_4$ are work areas for storing the DC coefficient and the AC coefficients of the upper left block, the upper right block, the lower left block and the lower right block within the current macro block, respectively on the other hand, the reference memory block $23_1$ is a work area for storing the DC coefficient and the AC coefficients of the block adjacent to the left of the upper left block of the current macro block. The reference memory block $23_2$ is a work area for storing the DC and AC coefficients of the block adjacent to the left of the lower left block of the current macro block.

Correspondingly, the temporary memory 24, incorporated in the motion vector prediction unit 13, is used for the motion vector prediction in addition to the shared memory 14. The temporary memory 24 is used for storing the motion vectors of four blocks within the current macro block and two blocks adjacent to the left of the current macro block. It should be noted that the motion vectors of two blocks adjacent to the left of the current macro block are required for the motion vector prediction, as understood from FIG. 2E.

Figure 9:
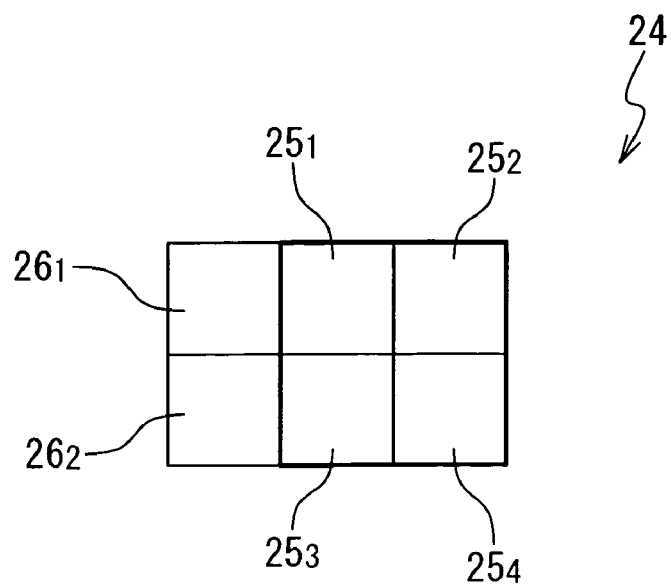
FIG. 9 is a conceptual view illustrating an exemplary structure of a temporary memory of a motion vector prediction unit within the video encoder in this embodiment.

FIG. 9 is a block diagram illustrating an exemplary structure of the temporary memory 24. The temporary memory 24 is provided with six memory blocks: object memory blocks $25_1$ to $25_4$ and reference memory blocks $26_1$ to $26_2$, each designed to store a motion vector of one block. The object memory blocks $25_1$, $25_2$, $25_3$ and $25_4$ are work areas for storing the motion vectors of the upper left block, the upper right block, the lower left block and the lower right block within the current macro block, respectively. On the other hand, the reference memory block $26_1$ is the work area for storing the motion vector of the block adjacent to the left of the upper left block of the current macro block, and the reference memory block $26_2$ is the work area for storing the motion vector of the block adjacent to the left of the lower left block of the current macro block.

In such an architecture, the capacity of the memory resource used as the work area in the DC/AC prediction and the motion vector prediction is the sum of the capacity required fort the DC and AC coefficients of one block line and additional six blocks, and the capacity required for storing the motion vectors of six blocks, and the capacity of the flag areas. The architecture is clearly advantageous, as compared with the memory capacity requirement of the prior arts, in which for the DC/AC prediction and the motion vector prediction requires storing the data associated with two macro block lines.

Hereinafter, a description is given of the DC/AC prediction and the motion vector prediction using the above-described architecture.

(2) Processing Procedure of DC/AC Prediction and Motion Vector Prediction

FIGS. 10A to 15B are conceptual views illustrating a preferred procedure for performing the DC/AC prediction and the motion vector prediction for macro blocks MB(i, 1) to MB(i, N), located in the i-th macro block line (or the i-th macro block row).

As shown in FIG. 10A (and FIG. 11A), before the initiation of the DC/AC prediction and the motion vector prediction with respect to the macro blocks MB(i, 1) to (i, N) located in the i-th macro block line, the data (that is, the DC and AC coefficients, or the motion vector) of the blocks B(2i–2, 1) to B(2i–1, 2N) in the block line adjacent to the top of the macro blocks MB(i, 1) to MB(i, N) located in the i-th macro block line are stored in the shared memory 14. In detail, the data associated with the blocks B(2i–1, 1) to (2i–1, 2N) are respectively stored in the memory blocks $32_1$ to $32_{2N}$ of the shared memory 14. It should be noted that invalid data are written in all the memory blocks 32 of the shared memory 14 to reset the memory blocks 32, before the initiation of the DC/AC prediction and the motion vector prediction on the macro blocks MB(1, 1) to (1, N) located in the uppermost macro block line (that is, the first macro block row). This is because the DC/AC prediction and the motion vector prediction for the macro blocks MB(1, 1) to (1, N) do not refer blocks on the upper side thereof. It will be understood that such a premise is appropriate from the fact that the DC/AC prediction and the motion vector prediction are recursive processing as described later. It should be note that "to write invalid data in a memory block" may be merely referred to as to "to reset", hereinafter.

The DC/AC prediction and the motion vector prediction for the respective blocks within the macro blocks MB (i, 1) to MB (i, N) located in the i-th macro block line are sequentially performed from the leftmost macro block. Although all the macro blocks are subjected to the same processing in the DC/AC prediction and the motion vector prediction, data transfers are differently performed depending on the positions of the macro blocks. The DC/AC prediction and the motion vector prediction for each macro block will be described below in detail.

(2-A) Processing of Leftmost Macro Block MB(i, 1)

FIGS. 10A, 10B, 11A and 11B are conceptual views illustrating the processing procedure of the leftmost macro block MB(i, 1).

As shown in FIG. 10A (and FIG. 11A), the DC/AC prediction and the motion vector prediction for the macro block MB (i, 1) located in the i-th macro block line begins, with resetting the reference memory blocks $23_1$ and $23_2$ of the temporary memory 21 within the DC/AC prediction unit 4, and with resetting the reference memory block $26_1$ and $26_2$ of the temporary memory 24 within the motion vector prediction unit 13. This is based on the fact that there are no reference blocks on the left of the leftmost current macro block MB (i, 1). In the attached figures, memory blocks in which invalid data are written are indicated by symbols "X".

The compression mode of the current macro block MB (i, 1) is then determined, and the shared memory 14 is connected to one of the DC/AC prediction unit 4 and the motion vector prediction units 13, in response to the determined compression mode.

When the current macro block MB (i, 1) is determined as being encoded by the intra-mode encoding, as shown in FIG. 10A, DC and AC coefficients associated with four blocks B(2i–1, 1), B(2i–1, 2), B(2i, 1) and B(2i, 2) within the current macro block MB (i, 1) are respectively stored in the object memory blocks $22_1$ to $22_4$ of the temporary memory 21 within the DC/AC prediction unit 4. On the other hand, the object memory blocks $25_1$ to $25_4$ of the temporary memory 24 within the motion vector prediction unit 13 are reset.

Furthermore, the data of the two blocks B(2i–2, 1) and B(2i–2, 2), which are adjacent to the top of the current macro block MB(i, 1), are read from the memory blocks $32_1$ and $32_2$ within the shared memory 14, and then the DC and AC coefficient difference data associated with the four blocks within the macro block MB(i, 1) are calculated using the data read from the memory blocks $32_1$ and $32_2$. It should be noted that the hatchings in FIG. 10A indicates memory blocks storing data are referenced in the DC/AC prediction. It should be noted that, when any of the read data does not include DC and AC coefficients (that is, when any of the read data is a motion vector or invalid data), such the read data is disregarded. The calculated DC and AC coefficient difference data are sent to the variable-length encoder 5, and are encoded by the variable-length encoder 5.

Essentially, sets of DC and AC coefficients associated with five blocks around the current macro block are required for the DC/AC prediction of the four blocks within the current macro block, in addition to the sets of the DC and AC coefficients of the four blocks (see FIG. 3E); however, the data of only the two blocks adjacent to the top of the leftmost macro block MB(i, 1) are used in the DC/AC prediction thereof.

Figure 10B:
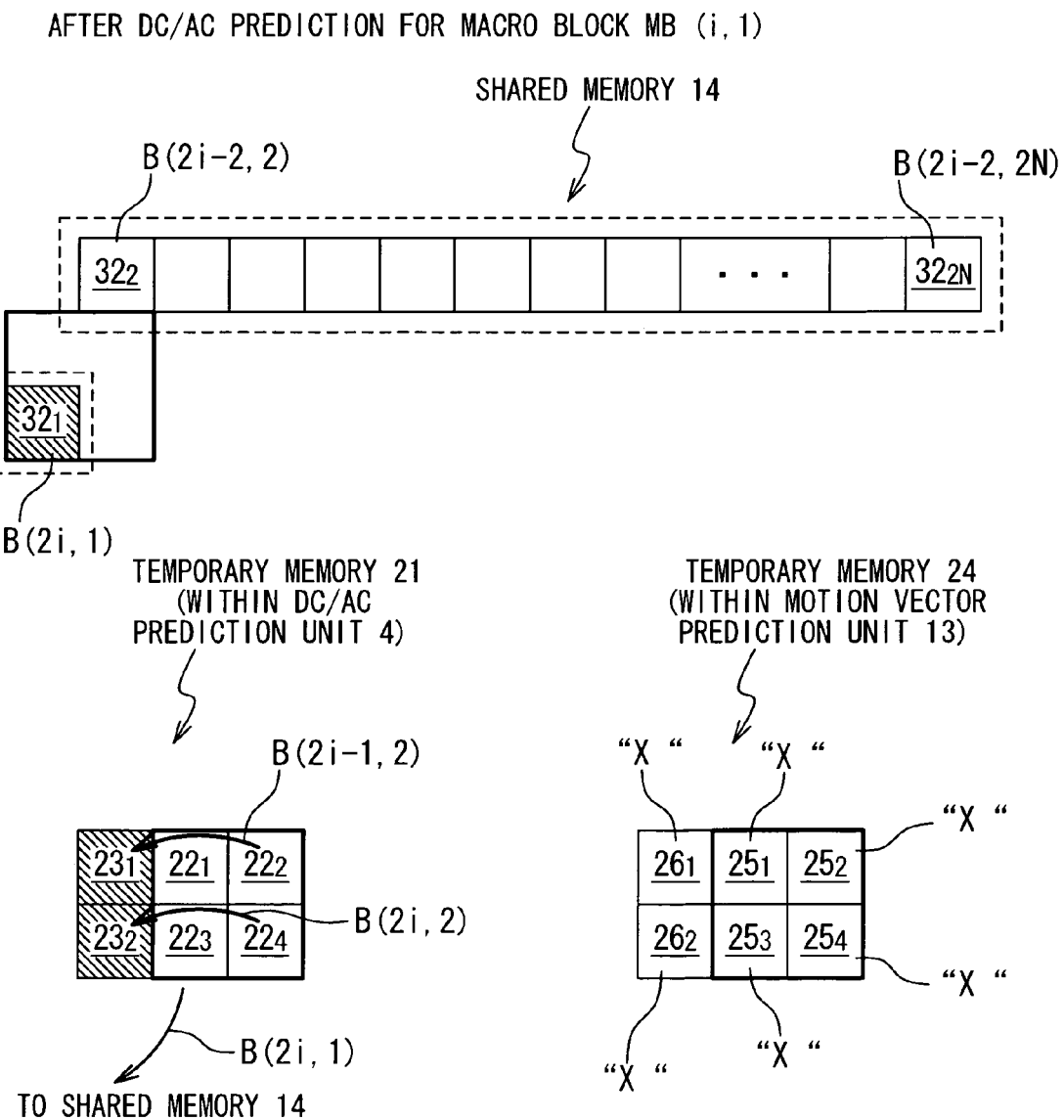

This is followed by data transfer between the shared memory 14 and the temporary memory 21 to update the shared memory 14 and the temporary memory 21, as shown in FIG. 10B. It should be noted that the hatchings in FIG. 10B indicates the data transfer destinations. Firstly, the DC and AC coefficients associated with the lower left block B(2i, 1) of the current macro block MB(i, 1) are transferred from the object memory block $22_3$ of the temporary memory 21 to the memory block $32_1$ of the shared memory 14. Furthermore, the DC and AC coefficients associated with the blocks B(2i–1, 2) and B(2i, 2), positioned in the right column of the current macro block MB (i, 1), are transferred from the object memory blocks $22_2$ and $22_4$ to the reference memory blocks $23_1$ and $23_2$ within the temporary memory 21. Thereby, the DC/AC prediction processing of the macro block MB (i, 1) is completed.

It should be noted that invalid data are stored in the reference memory blocks $26_1$ and $26_2$ of the temporary memory 24 within the motion vector prediction unit 13 after the DC/AC prediction of the macro block MB (i, 1) is completed. The motion vector prediction unit 13 recognizes that the macro block MB (i, 1) is encoded by the intra-mode encoding from the invalid data stored in the reference memory blocks $26_1$ and $26_2$ when the macro block MB(i, 2) is next encoded.

On the other hand, when the current macro block MB(i, 1) is encoded by the inter-mode encoding, as shown in FIG. 11A, the motion vectors associated with the four blocks B(2i–1, 1), B(2i–1, 2), B(2i, 1) and B(2i, 2) of the current macro block MB(i, 1) are respectively stored in the object memory blocks $25_1$ to $25_4$ of the temporary memory 24 within the motion vector prediction unit 13. On the other hand, the object memory blocks $22_1$ to $22_4$ of the temporary memory 21 of the DC/AC prediction unit 4 are reset.

Furthermore, the data associated with the three blocks B(2i–2, 1), B(2i–2, 2) and B(2i–2, 3) positioned in the block line adjacent to the top of the current macro block MB(i, 1) are read from the memory blocks $32_1$, $32_2$ and $32_3$ within the shared memory 14. This is followed by calculating the motion vector differences of the four blocks within the macro block MB(i, 1) by using the data read from the memory blocks $32_1$, $32_2$ and $32_3$. The hatchings in FIG. 11A indicate the memory blocks storing the data referenced in the motion vector prediction. It should be noted that, when any of the read data does not include a motion vector (that is, when any of the read data is DC and AC coefficients or invalid data), such the read data is disregarded. The calculated motion vector differences are sent to the variable-length encoder 5, and encoded by the variable-length encoder 5.

Although motion vectors associated with five blocks around the current macro block are essentially required for the motion vector prediction of four blocks of the current macro block in addition to the motion vectors of the four blocks, only the data associated with three of the five blocks are used in the motion vector prediction for the leftmost macro block MB (i, 1).

This is followed by data transfer between the shared memory 14 and the temporary memory 24 to update the contents thereof, as shown in FIG. 11B. First, the motion vector of the lower left block B(2i, 1) of the current macro block MB(i, 1) is transferred from the object memory block $25_3$ of the temporary memory 24 to the memory block $32_1$ of the shared memory 14. Furthermore, the motion vectors of the two blocks B(2i–1, 2) and B(2i, 2) positioned in the right column of the current macro block MB (i, 1) are transferred from the object memory blocks $25_2$ and $25_4$ of the temporary memory 24 to the reference memory blocks $26_1$ and $26_2$. Thereby, the motion vector prediction processing of the macro block MB (i, 1) is completed.

It should be noted that invalid data are stored in the reference memory blocks $23_1$ and $23_2$ of the temporary memory 21 within the DC/AC prediction unit 4 after the motion vector prediction of the macro block MB (i, 1) is completed. This allows the DC/AC prediction unit 4 to recognize that the macro block MB(i, 1) is encoded by the inter-mode encoding from the invalid data stored in the reference memory blocks $23_1$ and $23_2$ when the macro block MB(i, 2) is next encoded.

(2-B) Processing of Intermediate Macro Blocks MB(i, 2) to MB(i, N-1)

FIGS. 12A, 12B, 13A and 13B are conceptual views illustrating the processing of the intermediate macro block MB (i, j), j being any natural number ranging from 2 to N-1.

Figure 12A:
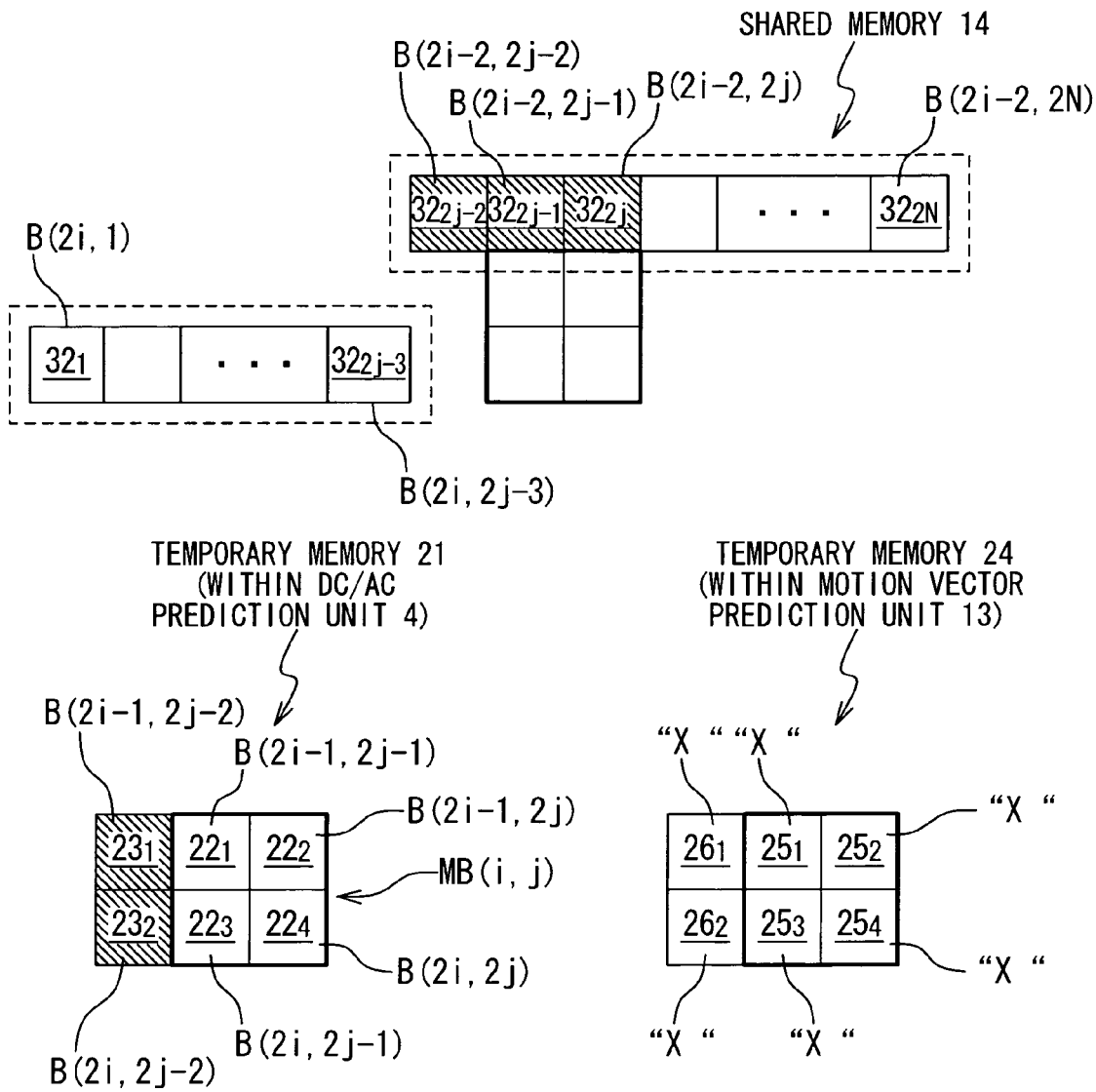

Before the DC/AC prediction or the motion vector prediction for the macro block MB(i, j) located j-th from the left in the i-th macro block line, as shown in FIG. 12A (and FIG. 13A), the memory blocks $32_1$ to $32_{2j-3}$ of the shared memory 14 store the data associated with the blocks B(2i, 1) to B(2i, 2j-3) (that is, the data used for the processing of the next macro block line), while the memory blocks $32_{2j-2}$ to $32_{2N}$ store the data associated with the blocks B(2i-2, 1) to B(2i-2, 2j-3). It will be understood from FIGS. 10B and 11B that this holds for j being 2, and it will be also understood that this holds for j ranging from 2 to N-1, from the fact that the DC/AC prediction and the motion vector prediction are recursively performed.

Figure 13A:
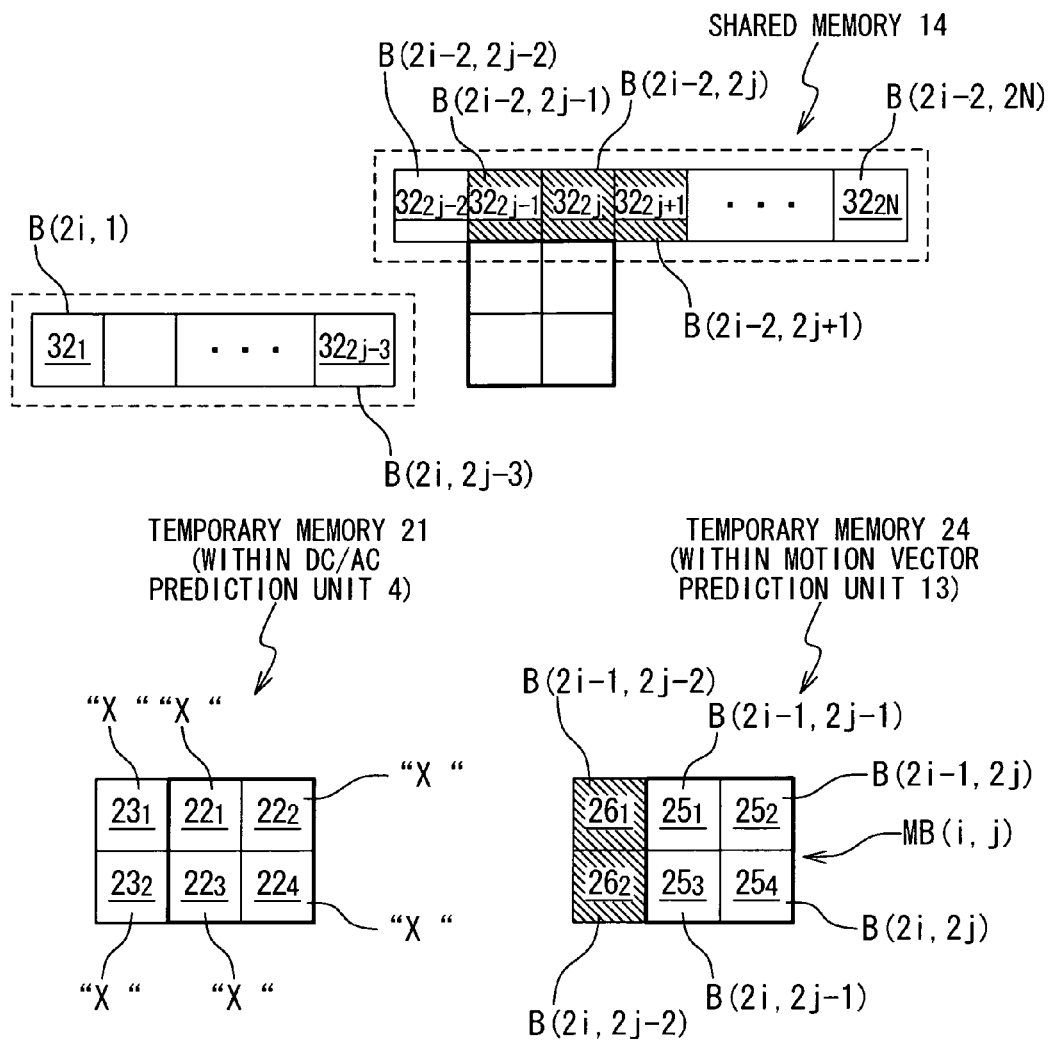
FIGS. 13A and 13B are conceptual views illustrating an exemplary procedure of the motion vector prediction for the intermediate macro block MB (i, j)

Furthermore, the reference memory blocks $23_1$ and $23_2$ of the temporary memory 21 within the DC/AC prediction unit 4 store the DC and AC coefficients associated with the blocks B(2i-1, 2j-2) and B(2i, 2 j-2) adjacent to the left of the current macro block MB (i, j). Instead, invalid data may be stored when DC and AC coefficients are not calculated for the blocks B(2i-1, 2j-2) and B(2i, 2 j-2). Correspondingly, the reference memory blocks $26_1$ and $26_2$ of the temporary memory 24 within the motion vector prediction unit 13 store the motion vectors associated with the blocks B(2i-1, 2j-2) and B(2i, 2 j-2) adjacent to the left of the current macro block MB (i, j). Instead, invalid data may be stored, when the motion vectors are not calculated. It will be understood that this holds for j being 2 from FIGS. 10B and 11B, and it will be also understood that this holds for j ranging from 2 to N-1 from the recursive processing to be described later. FIG. 12A illustrates the case where the DC and AC coefficients are stored in the reference memory blocks $23_1$ and $23_2$, and invalid data are stored in the reference memory blocks $26_1$ and $26_2$. On the other hand, FIG. 13A illustrates the case where invalid data are stored in the reference memory blocks $23_1$ and $23_2$ and motion vectors are stored in the reference memory blocks $26_1$ and $26_2$.

The processing procedure of the calculation of the DC and-AC coefficient difference data for the macro block MB(i, j) is almost the same as that for the macro block MB(i, 1). Specifically, the compression mode of the macro block MB(i, j) is firstly determined, and the shared memory 14 is connected to one of the DC/AC prediction unit 4 and the vector predictor 13 in response to the determined compression mode.

When the current macro block MB(i, j) is encoded by the intra-mode encoding, as shown in FIG. 12A, the DC and AC coefficients associated with the four blocks B(2i-1, 2j-1), B(2i-1, 2j), B,(2i, 2j-1) and B(2i, 2j) of the current macro block MB(i, j) are respectively stored in the object memory blocks $22_1$ to $22_4$ of the temporary memory 21 within the DC/AC prediction unit 4. On the other hand, the object memory blocks $25_1$ to $25_4$ of the temporary memory 24 within the motion vector prediction unit 13 are reset.

Furthermore, the data of the three blocks B (2i-2, 2j-2), B (2i-2, 2j-1) and B (2i-2, 2j) in the block line adjacent to the top of the current macro block MB (i, j) are read from the memory blocks $32_{2j-2}$, $32_{2j-1}$ and $32_{2j}$ of the shared memory 14. Additionally, the data associated with the blocks B(2i-1, 2j-2) and B(2i, 2j-2) are read from the reference memory blocks $23_1$ and $23_2$ of the temporary memory 21 within the DC/AC prediction unit 4. This is followed by calculating DC and AC coefficient difference data associated with the four blocks within the macro block MB(i, j) by using the data read from the memory blocks $32_{2j-2}$, $32_{2j-1}$ and $32_{2j}$, and the reference memory blocks $23_1$ and $23_2$. The hatchings in FIG. 12A indicate the memory blocks storing the data referenced in the DC/AC prediction. It should be noted that, when any of the read data is not DC and AC coefficients (that is, when any of the read data is a motion vector or invalid data), such the read data is disregarded.

It should be noted that the reference memory blocks $23_1$ and $23_2$ may store invalid data, instead of the DC and AC coefficient associated with the blocks B(2i-1, 2j-2) and B(2i, 2j-2) adjacent to the left of the current macro block MB(i, j). When the macro block MB(i, j-1) adjacent to the left of the current macro block MB (i, j) is encoded by the inter-mode encoding, invalid data are stored in the reference memory blocks $23_1$ and $23_2$, and thereby, the data stored in the reference memory blocks $23_1$ and $23_2$ are disregarded.

This is followed by data transfer between the shared memory 14 and the temporary memories 21 and 24 to update the contents thereof, as shown in FIG. 12B. It should be noted that the data transfer performed for the intermediate macro block MB (i, j) is different from the data transfer performed for the leftmost macro block MB (i, 1) (see FIG. 10B).

In detail, as shown in FIG. 12B, the data associated with the block B(2i, 2j-2) adjacent to the left of the lower left block of the current macro block MB(i, j) is transferred to the memory block $32_{2j-2}$ of the shared memory 14, and the data of the block B(2i, 2j-2) is transferred from one of the reference memory block 232 of the temporary memory 21 within the DC/AC prediction unit 4 and the reference memory blocks $26_2$ of the temporary memory 24 within the motion vector prediction unit 13, in response to the compression mode of the macro block MB (i, j-1) adjacent to the left of the current macro block MB(i, j). When the macro block MB (i, j-1) is encoded by the intra-mode encoding, the data associated with the block B (2i, 2j-2) includes DC and AC coefficients. In this case, the DC/AC prediction unit 4 transfers the DC and AC coefficients associated with the block B (2i, 2j-2) from the reference memory block 232 to the memory block $32_{2j-2}$. On the other hand, when the adjacent macro block MB (i, j-1) is encoded by the inter-mode encoding, the data associated with the block B (2i, 2j-2) includes a motion vector. In this case, the motion vector prediction unit 13 transfers the motion vector associated with the block B (2i, 2j-2) from the reference memory block $26_2$ to the memory block $32_{2j-2}$.

Additionally, the DC and AC coefficients associated with the lower left block B(2i, 2j-1) of the current macro block MB (i, j) are transferred from the object memory block $22_3$ of the temporary memory 21 to the memory block $32_{2j-1}$ of the shared memory 14. Furthermore, the DC and AC coefficients associated with the two blocks B(2i-1, 2j) and B(2i, 2j) arranged in the right column of the current macro block MB (i, j) are transferred from the object memory blocks $22_2$ and $22_4$ of the temporary memory 21 to the reference memory blocks $23_1$ and $23_2$.

In addition, the invalid data are transferred from the object memory blocks $25_2$ and $25_4$ of the temporary memory 24 to the reference memory blocks $26_1$ and $26_2$ within the motion vector prediction unit 13. This allows the motion vector prediction unit 13 to recognize that the macro block MB (i, j) is encoded by the intra-mode encoding, when the macro block MB (i, j+1) is next encoded. Thereby, the DC/AC prediction processing of the macro block MB (i, j) is completed.

On the other hand, when the current macro block MB(i, j) is encoded by the inter-mode encoding, as shown in FIG. 13A, the motion vectors associated with the four blocks B(2i-1, 1), B(2i-1, 2), B(2i, 1) and B(2i, 2) within the current macro block MB(i, 1) are stored in the object memory blocks $25_1$ to $25_4$ of the temporary memory 24 within the motion vector prediction unit 13, respectively. The object memory blocks $22_1$ to $22_4$ of the temporary memory 21 within the DC/AC prediction unit 4 are reset.

Furthermore, the data associated with the three blocks B $(2i-2, 2j-1)$, B $(2i-2, 2j)$ and B $(2i-2, 2j+1)$ in the block line adjacent to the top of the current macro block MB (i, j) are read from the memory blocks $32_{2j-1}$, $32_{2j}$ and $32_{2j+1}$ of the shared memory 14. Furthermore, the data are read from the reference memory blocks $26_1$ and $26_2$ of the temporary memory 24 within the motion vector prediction unit 13. This is followed by calculating the motion vector differences of the four blocks of the macro block MB(i, 1) by using the data read from the memory blocks $32_{2j-1}$, $32_{2j}$ and $32_{2j+1}$, and the reference memory blocks $26_1$ and $26_2$. The hatchings in Fin. 13A indicate the memory blocks storing the data referenced in the DC/AC prediction. It should be noted that, when any of the read data does not include the motion vector (that is, when any of the read data is DC and AC coefficients or invalid data), such the read data is disregarded.

It should be noted that the reference memory blocks $26_1$ and $26_2$ may store invalid data instead of the motion vectors associated with the blocks B($2i-1$, $2j-2$) and B($2i$, $2j-2$) adjacent to the left of the current macro block MB(i, j). When the macro block MB(i, j-1) adjacent to the left of the current macro block MB(i, j) is encoded by the intra-mode encoding, invalid data are stored in the reference memory blocks $26_1$ and $26_2$, and thereby the data stored in the reference memory blocks $26_1$ and $26_2$ are disregarded.

Figure 13B:
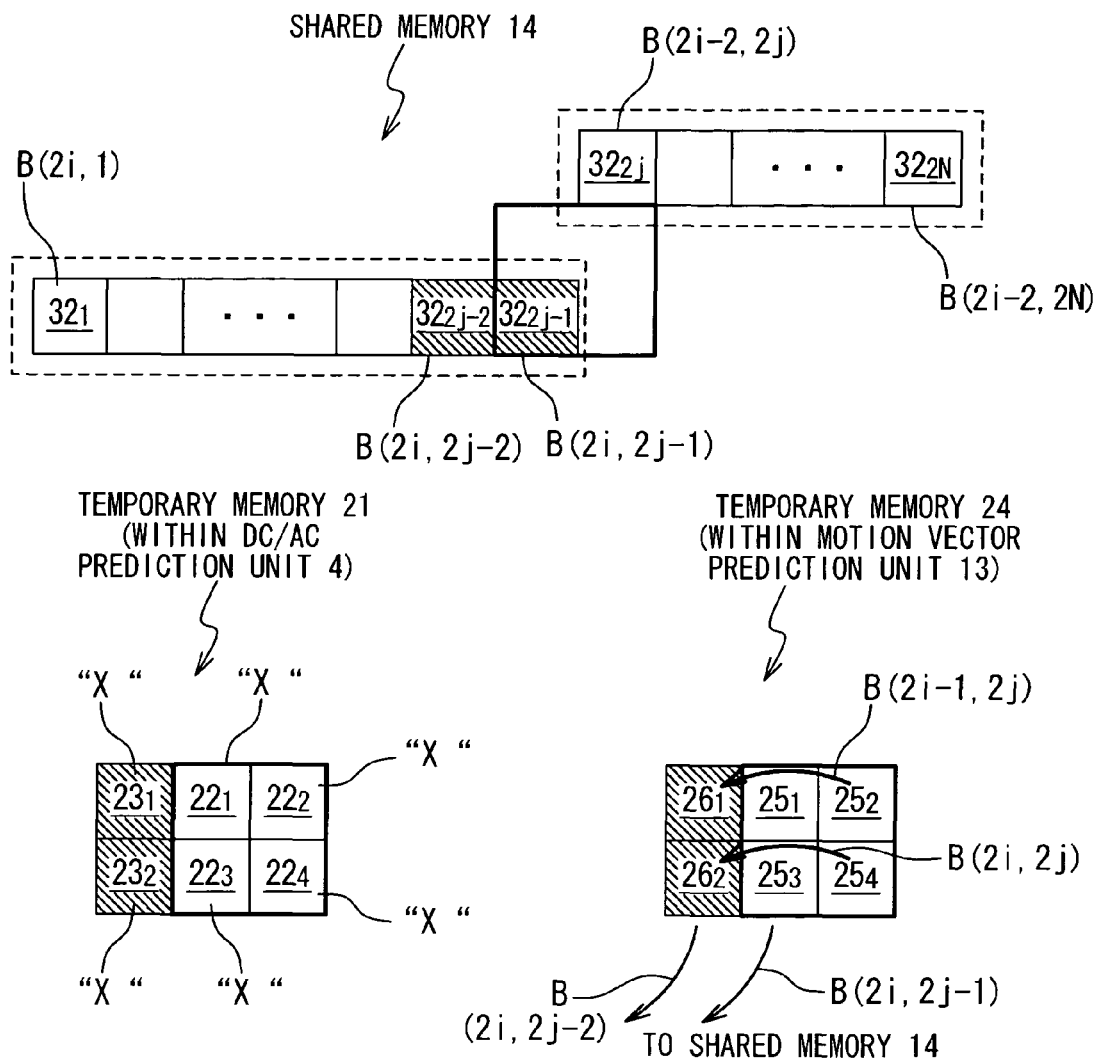
Figure 15A:
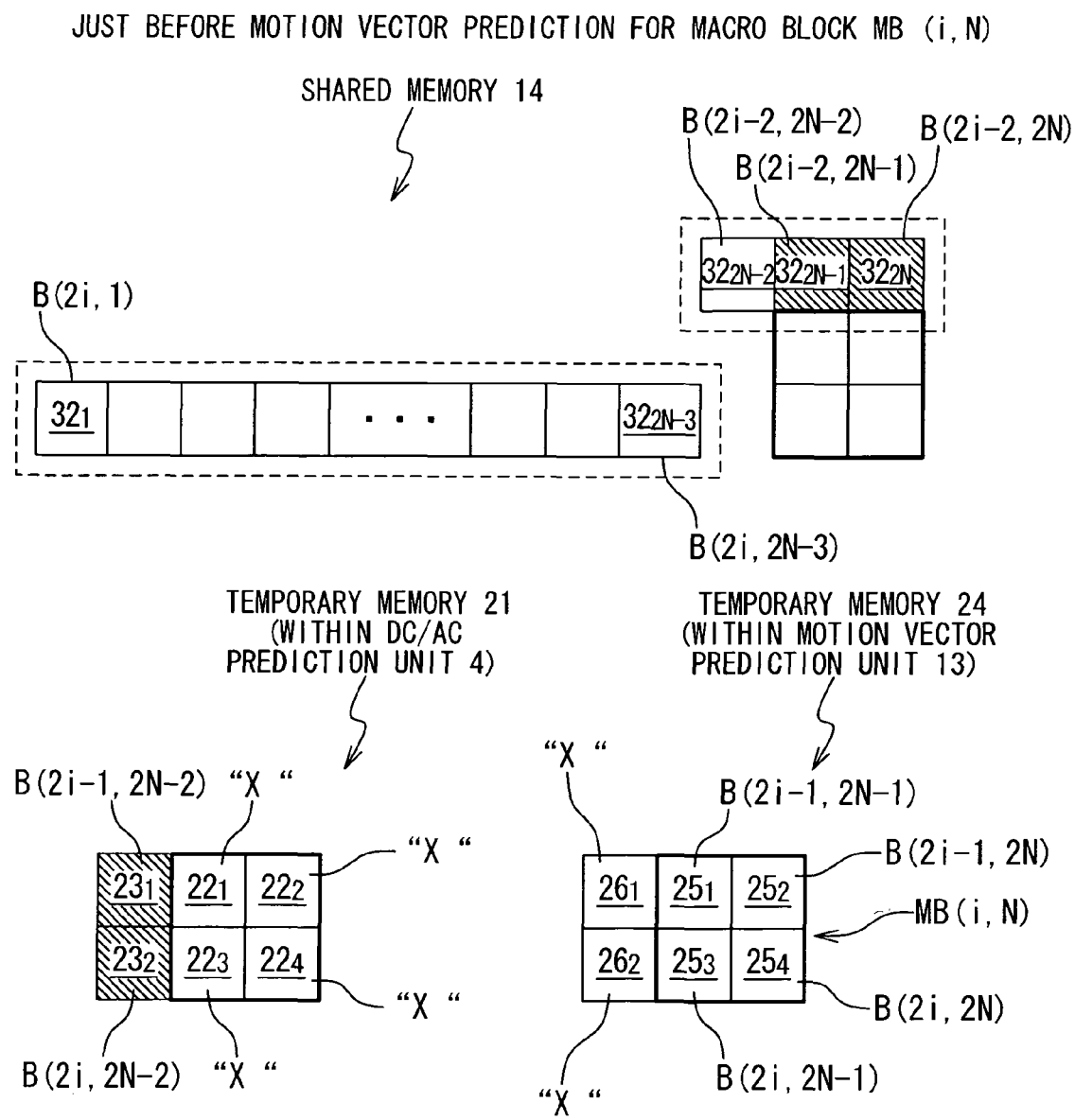

This is followed by data transfer between the shared memory 14 and the temporary memories 21 and 24 to update the contents thereof, as shown in FIG. 13B. Similarly to the case of the intra-mode encoding, the data associated with the block B($2i$, $2j-2$) adjacent to the lower left block of the current macro block MB(i, j) is transferred to the memory block $32_{2j-2}$ of the shared memory 14. When the macro block MB (i, j-1) adjacent to the left of the current macro block MB (i, j) is encoded by the intra-mode encoding, the data associated with the block B ($2i$, $2j-2$) includes DC and AC coefficients, and the DC and AC coefficients are transferred from the reference memory block $23_2$ of the DC/AC prediction unit 4 to the memory block $32_{2j-2}$. On the other hand, when the macro block MB(i, j-1) adjacent to the left of the current macro block MB (i, j) is encoded by the inter-mode encoding, the data associated with the block B($2i$, 2 j-2) includes a motion vector, and the motion vector associated with the block B($2i$, 2 j-2) is transferred from the reference memory block $26_2$ of the motion vector prediction unit 13 to the memory block $32_{2j-2}$.

Furthermore, the motion vector associated with the lower left block B($2i$, $2j-1$) of the current macro block MB (i, j) is transferred from the object memory block $25_3$ of the temporary memory 24 to the memory block $32_{2j-1}$ of the shared memory 14. Furthermore, the motion vectors associated with the two blocks B($2i-1$, $2j$) and B($2i$, $2j$) arranged in the right column of the current macro block MB(i, j) are transferred from the object memory blocks $25_2$ and $25_4$ to the reference memory blocks $26_1$ and $26_2$ within the temporary memory 24.

In addition, the invalid data are, transferred from the object memory blocks $22_2$ and $22_4$ of the temporary memory 21 to the reference memory block $23_1$, $23_2$ within the DC/AC prediction unit 4. This allows the DC/AC prediction unit 4 to recognize that the macro block MB (i, j) is processed by the intra-mode encoding when the macro block MB (i, j+1) is next encoded. Thereby, the motion vector prediction processing of the macro block MB (i, j) is completed.

Each of the macro blocks MB (i, 2) to MB (i, N-1) is subjected to the DC/AC prediction processing or the motion vector prediction processing described above.

(2-C) Processing of Rightmost Macro Block MB (i, N)

FIGS. 14A, 14B, 15A and 15B are conceptual views illustrating the processing of the rightmost macro block MB (i, N). The processing of the DC/AC prediction and the motion vector prediction for the rightmost macro block MB (i, N) is almost same as the processing of the intermediate macro blocks described above (see FIGS. 14A and 15A). The difference is that special data transfer is performed between the shared memory 14 and the temporary memories 21 and 24 for the rightmost macro block MB (i, N).

As shown in FIGS. 14B and 15B, the data associated with the block B($2i$, $2j-2$) adjacent to the left of the lower left block of the current macro block MB(i, j) is transferred to the memory block $32_{2j-2}$ of the shared memory 14, regardless of the compression mode of the macro block MB (i, N), after the DC/AC prediction or the motion vector prediction of the macro block MB(i, N) is completed. In detail, when the macro block MB (i, j-1) adjacent to the left of the current macro block MB (i, j) is encoded by the intra-mode encoding, the data associated with the block B ($2i$, 2 j-2) includes DC and AC coefficients, and the DC and AC coefficients associated with the block B ($2i$, 2 j-2) are transferred from the reference memory block $23_2$ of the DC/AC prediction unit 4 to the memory block $32_{2j-2}$ of the shared memory 14. On the other hand, when the macro block MB(i, j-1) adjacent to the left of the current macro block MB (i, j) is encoded by the inter-mode encoding, the data associated with the block B($2i$, $2j-2$) includes a motion vector, and the motion vector associated with the block B($2i$, $2j-2$) is transferred from the reference memory block $26_2$ of the motion vector prediction unit 13 to the memory block $322j-2$.

Furthermore, as shown in FIG. 14B, when the macro block MB (i, N) is encoded by the intra-mode encoding, the DC and AC coefficients associated with the two blocks B ($2i$, 2N-1) and B ($2i$, 2N) arranged in the lower row of the current macro block MB (i, j) are transferred from the object memory blocks $22_3$ and $22_4$ of the temporary memory 21 to the memory blocks $32_{2N-1}$ and $32_{2N}$ of the shared memory 14. Thereby, the data associated with the block line at the bottom of the macro blocks MB(i, 1) to MB (i, N) in the i-th macro block line is completely prepared in the shared memory 14. This implies that the preparation is completed for the processing of the macro blocks MB(i+1, 1) to MB(i+1, N) in the next macro block line.

On the other hand, when the macro block MB(i, N) is encoded by the inter-mode encoding, the motion vectors associated with the two blocks B($2i$, 2N-1) and B($2i$, 2N) arranged on the lower row of the current macro block MB(i, j) are transferred from the object memory blocks $25_3$ and $25_4$ of the temporary memory 24 to the memory blocks $32_{2N-1}$ and $32_{2N}$ of the shared memory 14, after the motion vector prediction for the macro block MB(i, N) is completed. Thereby, the data associated with the block line arranged at the bottom of the macro blocks MB(i, 1) to MB (i, N) in the i-th macro block line is completely prepared in the shared memory 14. This implies that the preparation is completed for the processing of the macro blocks MB(i+1, 1) to MB(i+1, N) of the next macro block line.

3. Intermediate Summary and Complement

The architecture and operation described above effectively achieves the DC/AC prediction and the motion vector prediction with reduced memory resources. This is effective in the reduction of the hardware of the video encoder 10.

Although the video encoder 10 in this present embodiment is designed to support the MPEG4 SP specification, it is apparent to those skilled in the art that the present invention may be applied to any video encoder that performs both of the DC/AC prediction and the vector prediction.

For example, the video encoder 10 in this embodiment may be also applied to the MPEG4 ASP (advanced simple profile) specification with the structure and operation changed to support the bidirectional prediction. In this case, the structures and operations of the video memory 9, the motion estimation unit 11 and the motion compensation unit 12 in the video encoder 10 are changed to support the bidirectional prediction; The bidirectional prediction technique is well known in the art, and the change of the constitution for corresponding to the bidirectional prediction would be obvious for those skilled in the art. In this case, the motion estimation unit 11 calculates a forward motion vector and a backward motion vector for each block, and sends the calculated forward and backward motion vectors to the motion vector prediction unit. 13. The motion vector prediction unit 13 stores the received forward and backward motion vectors in the shared memory 14 if necessary.

Figure 16:
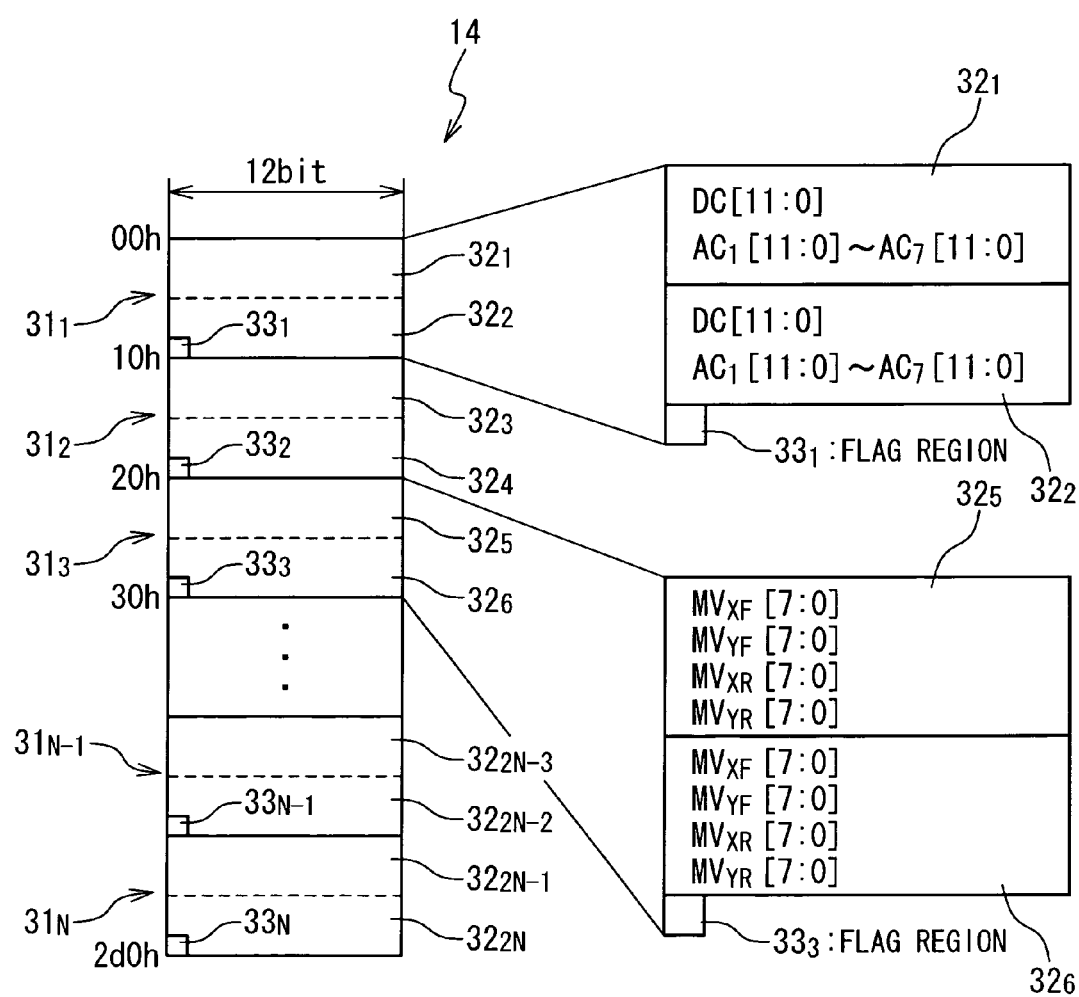
FIG. 16 is a conceptual view illustrating another exemplary memory map of the shared memory within the video encoder in this embodiment, in the case when the video encoder is designed to support bidirectional prediction.

FIG. 16 illustrates a memory map of the shared memory 14 when the structure and operation of the video encoder 10 is changed to support the bidirectional prediction. Notedly, it is not necessary to increase the capacity of the shared memory 14 so as to support the bidirectional prediction. The capacity required for storing forward and backward motion vectors calculated for one block is smaller than the capacity required for storing the DC and AC coefficients calculated for, one block. This means that the bidirectional prediction is achieved by changing only the memory map without increasing the capacity of the shared memory 14.

Video Decoder

1. Overall Structure and Operation of Video Decoder

FIG. 17 is a block diagram illustrating an exemplary structure of a video decoder 40 in one embodiment of the present invention. The video decoder 40 also includes a shared memory to reduce the overall capacity of the memory resource, as described below in detail.

Specifically, the video decoder 40 is provided with a variable-length decoder 41, an inverse DC/AC prediction unit 42, an inverse quantizer 43, an inverse DCT processing unit 44, an adder 45, an inverse motion vector predictor 46, a video memory 47, and a motion compensation unit 48.

The variable-length decoder 41 applies variable-length decoding to externally-inputted encoded data. When the current macro block is encoded by the intra-mode encoding, the DC and AC coefficient difference data associated with the current macro block are extracted from the encoded data. When the current macro block is encoded by the inter-mode encoding, the motion vector differences associated with the current macro block are extracted from the encoded data. The DC and AC coefficient difference data are sent to the inverse DC/AC prediction unit 42, and the motion vector differences are sent to the inverse motion vector prediction unit 46.

The inverse DC/AC prediction unit 42 performs inverse DC/AC prediction on the DC and AC coefficient difference data to reproduce the quantized DC and AC coefficients. The inverse DC/AC prediction unit 42 is provided with a temporary memory 51, and uses the temporary memory 51 to reproduce the DC and AC coefficients. A data through path 42a for bypassing the inverse DC/AC prediction unit 42 is additionally provided in the video decoder 40. The data through path 42a is used when the inverse DC/AC prediction is not performed (that is, when the current macro block is encoded by the inter-mode encoding).

The inverse quantizer 43 performs inverse quantization to the (quantized) DC and AC coefficients received from the inverse DC/AC prediction unit 42 to reproduce the DC and AC coefficients.

The inverse DCT processing unit 44 applies inverse discrete cosine transform to the DC and AC coefficients reproduced by the inverse quantizer 43 to thereby obtain video data.

The adder 45 is responsive to the compression mode of the current macro block for outputting the video data received from the inverse DCT processing unit 44 as they are, or outputting the sum of the video data received from the inverse DCT processing unit 44 and motion-compensated video data outputted from the motion compensation unit 48. The output of the adder 45 is desired decoded data.

The inverse motion vector prediction unit 46 performs inverse motion vector prediction on the motion vector difference extracted by the variable-length decoder 41 to reproduce motion vectors. The inverse motion vector prediction unit 46 is provided with a temporary memory 54, and uses the temporary memory 54 to reproduce the motion vectors.

The video memory 47 stores the video data received from the adder 45.

The motion compensation unit 48 uses the video data stored in the video memory 47 as reference video data to perform motion compensation by using the motion vectors received from the inverse motion vector prediction unit 46. As described above, the output of the motion compensation unit 48 is connected to the adder 45.

The video decoder 40 is additionally provided with a shared memory 49 accessible from both of the inverse DC/AC prediction unit 42 and the inverse motion vector prediction unit 46. The shared memory 49 is a work area used for storing the DC and AC coefficients and the motion vectors calculated for the blocks in the block line adjacent to the top of the current macro block; the inverse DC/AC prediction unit 42 and the inverse motion vector prediction unit 46 share the shared memory 49 as the work area. The shared memory 49 is connected to the inverse DC/AC prediction unit 42 and the inverse motion vector prediction unit 46 via a selector 50, and one predictor selected by the control signal C is allowed to access the shared memory 49.

The operation of the video decoder 40 depends on the compression mode of the current macro block. When the current macro block is encoded by the intra-mode encoding, the current-macro block is decoded using the variable-length decoding, the inverse DC/AC prediction, the inverse quantization, and the inverse DCT. In detail, the DC and AC coefficient difference data are reproduced by the variable-length decoder 41, and the (quantized) DC and AC coefficients are reproduced by the inverse DC/AC prediction unit 42 from the DC and AC coefficient difference data. Furthermore, the DC and AC coefficients are inverse-quantized by the inverse quantizer 43. Furthermore, the inverse discrete cosine transform is applied to the DC and AC coefficients by the inverse DCT processing unit 44, and thereby the decoded data of the current macro block is generated; the adder 45 outputs the output of the inverse DCT processing unit 44 as they are, to externally output the decoded data.

On the other hand, when the current macro block is encoded by the inter-mode encoding, the current macro block is decoded using the motion compensation. In detail, motion vector differences are reproduced by the variable-length decoder 41, and the motion vectors are reproduced from the motion vector differences by the inverse motion vector prediction unit 46. Furthermore, the motion compensation is performed by the motion compensation unit 48 on the reference video data received from the video memory 47 by using the motion vectors received from the inverse motion vector prediction unit 46. The motion-compensated video data are decoded by using the variable-length decoding, the inverse quantization and the inverse DCT to output the decoded data.

One of the important features of the video decoder 40 in this embodiment is that the shared memory 49 accessible from both of the inverse DC/AC prediction unit 42 and the inverse motion vector prediction unit 46 is provided as a work area, correspondingly to the video encoder 10 described above. In detail, the video decoder 40 in this embodiment adopts architecture in which the data associated with the block line adjacent to the top of the current macro block are stored in the shared memory 49 and the data of the current macro block and the data of two blocks adjacent to the left of the current macro block are stored in the temporary memories 51 and 54 within the inverse DC/AC prediction unit 42 and the inverse motion vector prediction unit 46. In the video decoder 40 in this embodiment, the overall capacity of the memory area used for performing the inverse DC/AC prediction and the inverse motion vector prediction is reduced by using the architecture and by optimizing the data transfer between the shared memory 49 and the temporary memories 51 and 54. The following is a description of the inverse DC/AC prediction processing and the inverse motion vector prediction processing using the shared memory 49 and the temporary memories 51 and 54.

2. Processing Procedure of Inverse DC/AC Prediction and Inverse Motion Vector Prediction FIGS. 18A to 23B are conceptual views illustrating a preferred procedure of performing the inverse DC/AC prediction and the inverse motion vector prediction on the macro blocks MB(i, 1) to MB(i, N) located in the i-th macro block line.

Referring to FIG. 18A, the structures of the shared memory 49 and the temporary memories 51 and 54 are the same as those of the shared memory 14 and the temporary memories 21 and 24 within the video encoder 10. In detail, the shared memory 49 is provided with 2N memory blocks $62_1$ to $62_{2N}$ as in the shared memory 14 of the video encoder 10. Every two memory blocks $62_{2j-1}$ and $62_{2j}$ are incorporated within one memory area, as in the shared memory 14. Each memory area includes a flag area (not shown) in which a flag indicative of the kind of data stored in the memory blocks $62_{2j-1}$ and $62_{2j}$. It should be noted that the memory areas and the flag areas are not shown in FIG. 18A. Furthermore, the temporary memory 51 of the inverse DC/AC prediction unit 42 is provided with object memory blocks $52_1$ to $52_4$ and reference memory blocks $53_1$ and $53_2$, similarly to the temporary memory 21 of the DC/AC prediction unit 4 within the video encoder 10. Correspondingly, the temporary memory 54 within the inverse motion vector prediction unit 46 is provided with object memory blocks $55_1$ to $55_4$ and reference memory blocks $56_1$ to $56_2$. In the processing of the inverse DC/AC prediction and the inverse motion vector prediction, data are transferred between the shared memory 49 and the temporary memories 51 and 54.

The procedure of the inverse DC/AC prediction: and the inverse motion vector prediction for the macro block MB(i, 1) to MB(i, N) located in the i-th macro block line is similar to the procedure of the DC/AC prediction and the motion vector prediction for the macro blocks MB(i, 1) to MB(i, N) located in the i-th macro block line, except that the inverse DC/AC prediction is performed instead of the DC/AC prediction and the inverse motion vector prediction is performed instead of the motion vector prediction. Hereinafter, the procedure of the inverse DC/AC prediction and the inverse motion vector prediction will be described in detail.

(2-A) Processing of Leftmost Macro Block MB(i, 1)

As shown in FIG. 18A (and FIG. 19A), previously-reproduced data (that is, reproduced DC and AC coefficients or reproduced motion vectors) obtained by previously performing the inverse DC/AC prediction and the inverse motion vector prediction for the blocks B(2i−2, 1) to B(2i−1, 2N) in the block line adjacent to the top of the macro block MB (i, 1) are stored in the shared memory 49, before the initiation of the inverse DC/AC prediction and the inverse motion vector prediction to the macro blocks MB(i, 1) to (i, N) located in the i-th macro block line. In detail, the reproduced data associated with the blocks B(2i−1, 1) to B(2i−1, 2N) are respectively stored in the memory blocks $62_1$ to $62_{2N}$ of the shared memory 49. It should be noted that, for the inverse DC/AC prediction and the inverse motion vector prediction to the macro block MB(1, 1) of the uppermost row (the first row), invalid data are written in all the memory blocks 62 of the shared memory 49 to reset the memory blocks 62. It will be understood that such a premise is appropriate from the recursive processing of the DC/AC prediction and the motion vector prediction to be described later.

The inverse DC/AC prediction and the inverse motion vector prediction for the macro blocks MB(i, 1) to (i, N) located in the i-th macro block line begins with the processing of the leftmost macro block MB(i, 1). FIGS. 18A, 18B, 19A and 19B are conceptual views illustrating the processing of the leftmost macro block MB (i, 1).

As shown in FIG. 18A (and FIG. 19A), the inverse DC/AC prediction and the inverse motion vector prediction of the macro block MB (i, 1) located in the i-th macro block line begins with resetting the temporary memory 51 within the inverse DC/AC prediction unit 42 and the temporary memory 54 within the inverse motion vector prediction unit 46.

When the current macro block MB(i, 1) is encoded by the intra-mode encoding, the DC and AC coefficient difference data and the control data attached therewith are sent from the variable-length decoder 41 to the inverse DC/AC prediction unit 42, and the DC and AC coefficients are reproduced from the DC and AC coefficient difference data and the control data received from the variable-length decoder 41. As described above, the control data indicate which reference blocks are used for the calculation of the DC and AC coefficient difference data. Specifically, as shown in FIG. 18A, the DC and AC coefficients reproduced for the blocks specified by the control data are read from the associated memory blocks within the shared memory 49, and the DC and AC coefficients of the respective blocks within the current macro block MB (i, 1) are reproduced from the DC and AC coefficients read from the shared memory 49, and the DC and AC coefficient difference data received from the variable-length decoder 41. In FIG. 18A, the hatchings indicate the memory blocks from which the DC and AC coefficients may be allowed to be read.

Let us consider the case, for example, where the control data indicate to use DC and AC coefficients associated with the block B(2i−2,1), which is adjacent to the top of the block B(2i−1, 1), for reproducing DC and AC coefficients associated with the block B(2i−1, 1), which is the upper left block within the macro block MB (i, 1). In this case, the DC and AC coefficients associated with the block B(2i−1, 1) are read from the memory block 62, of the shared memory 49, and the DC and AC coefficients associated with the block B (2i−1, 1) are reproduced from the DC and AC coefficients read from the memory block $62_1$, and the DC and AC coefficient difference data associated with the block B ($2i-1$, 1). The same applies to other blocks within the current macro block MB (i, 1).

As shown in FIG. 18B, the reproduced DC and AC coefficients are stored in the object memory blocks $52_1$ to $52_4$ of the temporary memory 51 within the inverse DC/AC prediction unit 42. Specifically, after the DC and AC coefficients associated with the block B ($2i-1$, 1) are reproduced, the reproduced DC and AC coefficients are stored in the object memory block $52_1$. Correspondingly, the reproduced DC and AC coefficients associated with the block B ($2i-1$, 2), B($2i$, 1), and B($2i$, 2) are stored in the object memory blocks $52_2$, $52_3$ and $52_4$, respectively. The reproduced DC and AC coefficients are sent to the inverse quantizer 43 from the object memory blocks $52_1$ to $52_4$.

This is followed by data transfer between the shared memory 49 and the temporary memory 51 to update the contents of the shared memory 49 and temporary memory 51, as shown in FIG. 18B. It should be noted that the hatchings in FIG. 18 indicate the data transfer destinations. First, the DC and AC coefficients reproduced for the lower left block B($2i$, 1) of the current macro block MB(i, 1) are transferred from the object memory block $52_3$ of the temporary memory 51 to the memory block $62_1$ of the shared memory 49. Furthermore, the DC and AC coefficients reproduced for the two blocks B($2i-1$, 2) and B($2i$, 2) arranged on the right column of the current macro block MB(i, 1) are transferred from the object memory blocks $52_2$ and $52_4$ of the temporary memory 51 to the reference memory blocks $53_1$ and $53_2$. Thereby, the inverse DC/AC prediction processing of the macro block MB (i, 1) is completed.

On the other hand, as shown in FIG. 19A, when the current macro block MB(i, 1) is encoded by the inter-mode encoding, the motion vector differences and the control data attached therewith are sent from the variable-length decoder 41 to the inverse motion vector prediction unit 46, and the motion vectors are reproduced from the motion vector differences and the control data attached therewith. As described above, the control data indicate which reference blocks are used for the calculation of the motion vector differences. Specifically, the motion vectors reproduced for the blocks specified by the control data are read from the associated memory blocks, and the motion vectors associated with the respective blocks of the current macro block MB(i, 1) are reproduced from the motion vectors read from the associated memory blocks and the motion vector differences. In FIG. 19A, the hatchings indicate the memory blocks from which the motion vectors may be allowed to be read.

Figure 19B:
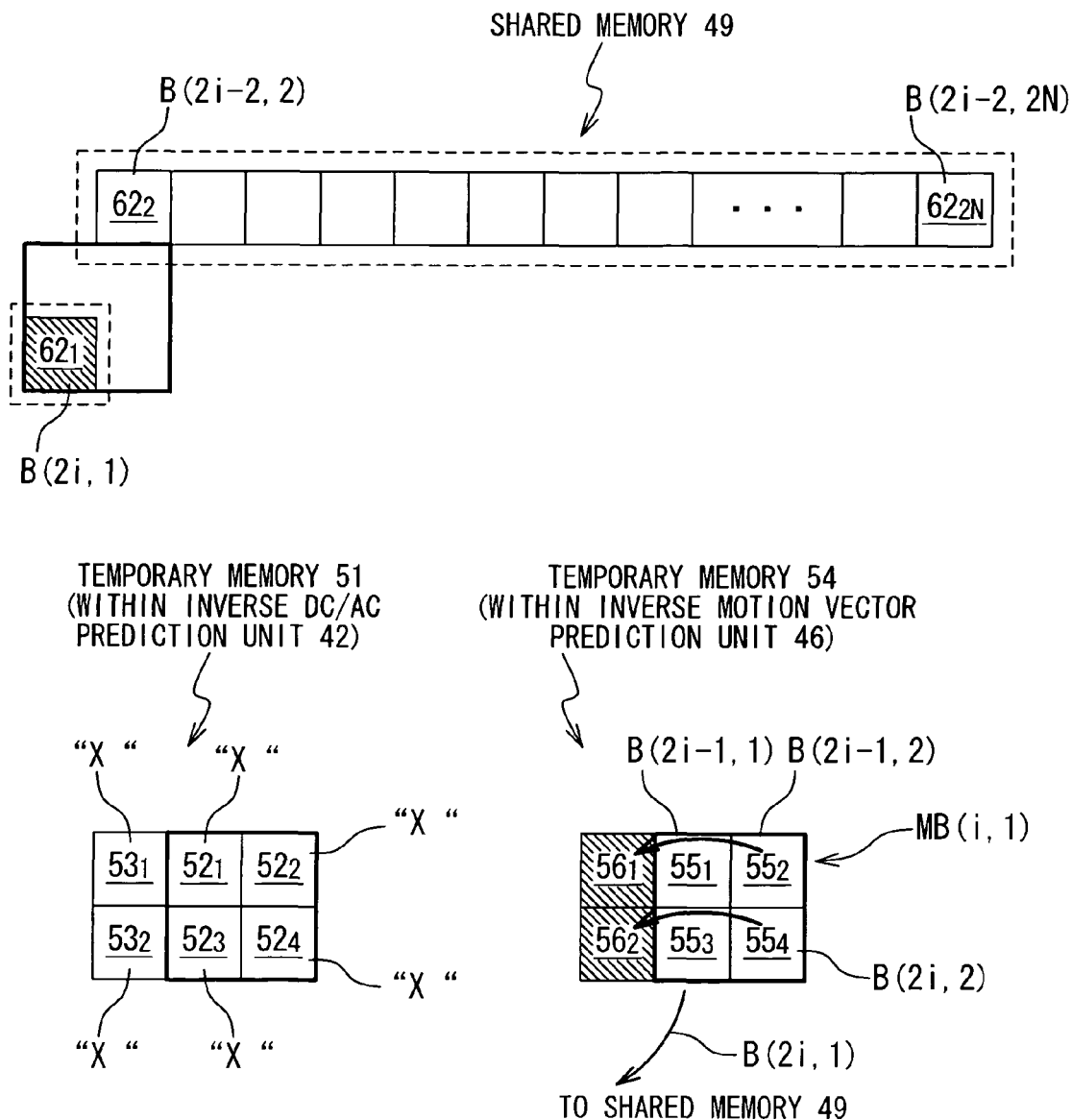

The reproduced motion vectors are stored in the object memory blocks $55_1$ to $55_4$ of the temporary memory 54 within the inverse motion vector prediction unit 46 as shown in FIG. 19B. Specifically, after the motion vector associated with the block B($2i-1$, 1) is reproduced, the reproduced motion vector is stored in the object memory block $52_1$. Correspondingly, the reproduced motion vectors associated with the blocks B ($2i-1$, 2), B ($2i$, 1) and B ($2i$, 2) are stored in the object memory blocks $55_2$, $55_3$ and $55_4$, respectively. The reproduced motion vector is sent to the motion compensation unit 48 from the object memory blocks $55_1$ to $55_4$.

This is followed by data transfer between the shared memory 49 and the temporary memory 54 to update the contents thereof, as shown in FIG. 19B. It should be noted that the hatchings indicate the data transfer destinations in FIG. 19B. Specifically, the motion vector reproduced for the lower left block B($2i$, 1) of the current macro block MB(i, 1) is transferred from the object memory block $55_3$ of the temporary memory 54 to the memory block $62_1$ of the shared memory 49. Furthermore, the motion vectors reproduced for the blocks B($2i-1$, 2) and B($2i$, 2) arranged on the right column of the current macro block MB(i, 1) are transferred from the object memory blocks $55_2$ and $55_4$ of the temporary memory 54 to the reference memory blocks $56_1$ and $56_2$. Thereby, the inverse motion vector prediction processing of the macro block MB (i, 1) is completed.

(2-B) Processing of Intermediate Macro Blocks MB(i, 2) to MB(i, N-1)

FIGS. 20A, 20B, 21A and 21B are conceptual views illustrating the processing of the intermediate macro block MB (i, j), j being any natural number ranging from 2 to N-1.

Before the inverse DC/AC prediction or the inverse motion vector prediction for the macro block MB(i, j) located j-th from the left in the i-th macro block line, as shown in FIG. 20A (and FIG. 21A), the memory blocks $62_1$ to $62_{2j-3}$ of the shared memory 49 store the data associated with the blocks B($2i$, 1) to B($2i$, $2j-3$) (that is, the data used for the processing of the next macro block line), while the memory block $62_{2j-2}$-$62_{2N}$ store the data associated with the blocks B($2i-2$, 1) to B($2i-2$, $2j-3$). It will be understood that this holds for j being 2 from FIGS. 18B and 19B, and that this also holds for j ranging from 2 to N-1 from the fact that the processing described below is recursive.

Furthermore, the DC and AC coefficients reproduced for the two blocks B($2i-1$, $2j-2$) and B($2i$, $2j-2$) adjacent to the left of the current macro block MB(i, j) are stored in the reference memory blocks $53_1$ and $53_2$ of the temporary memory 51 within the inverse DC/AC prediction unit 42. When the DC and AC coefficients are not calculated for the blocks B($2i-1$,$2j-2$) and B($2i$, $2j-2$), invalid data are stored instead. Correspondingly, the motion vectors associated with the two blocks B($2i-1$, $2j-2$) and B($2i$, $2j-2$) are stored in the reference memory blocks $56_1$ and $56_2$ of the temporary memory 54 within the inverse motion vector prediction unit 46. When the motion vectors are not calculated for the blocks B($2i-1$, $2j-2$) and B($2i$, $2j-2$), invalid data are stored instead. It will be understood that this holds for j being 2 from FIG. 18B and 19B, and that this also holds for j ranging from 2 to N-1 from the fact that processing described below is recursive. FIG. 20A illustrates the case where the DC and AC coefficients are stored in the reference memory blocks $53_1$ and $53_2$ and invalid data are stored in the reference memory block $56_1$, $56_2$. FIG. 21A illustrates the case where invalid data are stored in the reference memory blocks $53_1$ and $53_2$ and motion vectors are stored in the reference memory blocks $56_1$ and $56_2$.

The processing procedure of the reproduction of the DC and AC coefficients and motion vectors associated with the macro block MB(i, j) are almost the same as the processing procedures for the macro block MB(i, 1) described above.

When the current macro block MB (i, j) is encoded by the intra-mode encoding, as shown in FIG. 20A, the DC and AC coefficient difference data and the control data attached therewith are sent from the variable-length decoder 41 to the inverse DC/AC prediction unit 42, and the DC and AC coefficients are reproduced using the DC and AC coefficient difference data and the control data received from the variable-length decoder 41. As described above, the control data indicate which reference blocks are used for the calculation of the DC and AC coefficient difference data. Specifically, the DC and AC coefficients reproduced for the blocks specified by the control data are read from the associated memory blocks. The DC and AC coefficients associated with the respective blocks within the current macro block MB (i, 1) are reproduced from the DC and AC coefficients read from the associated memory blocks, and the DC and AC coefficient difference data. In FIG. 20A, the hatchings indicate the memory blocks from which the DC and AC coefficients may be allowed to be read.

Figure 20B:
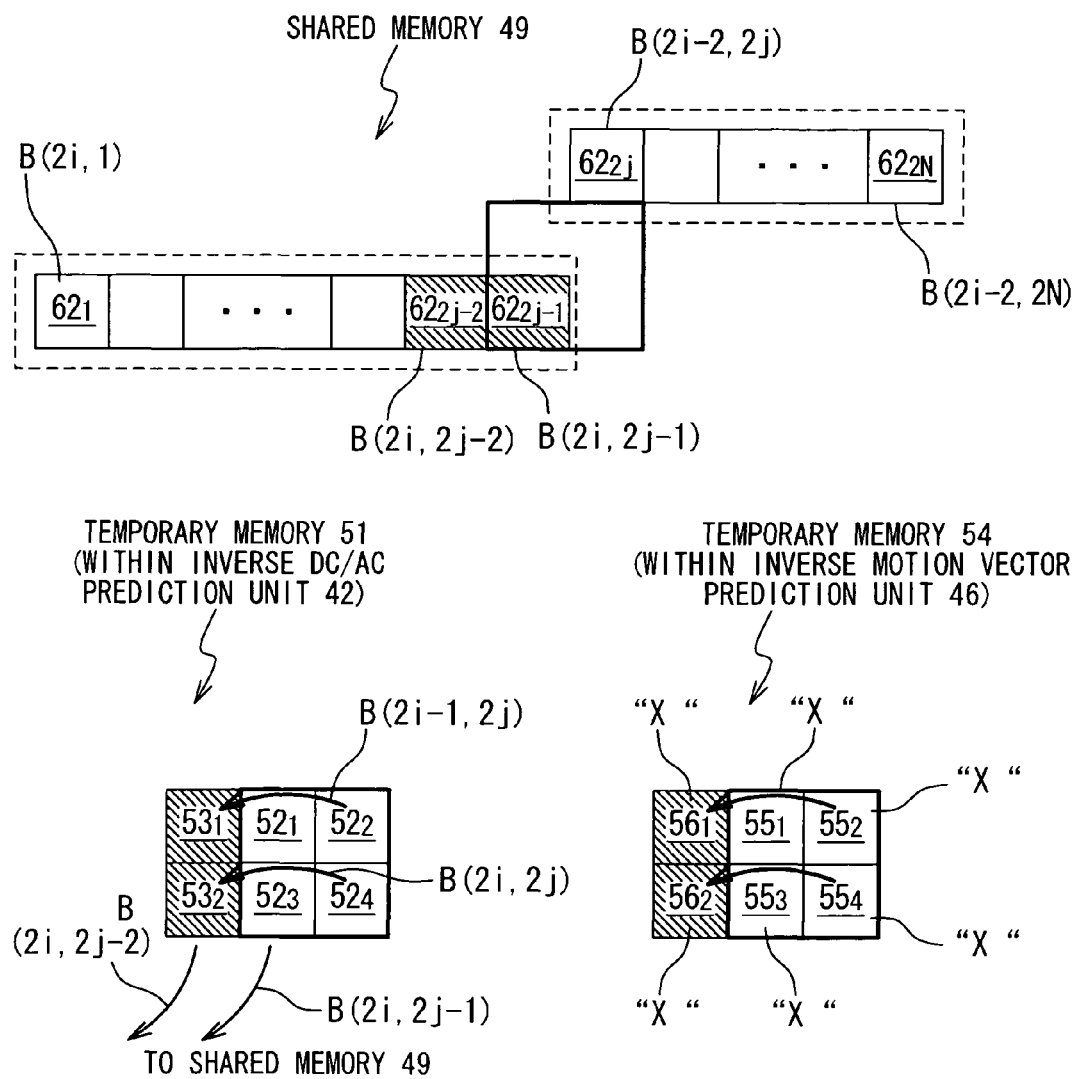
Figure 21A:
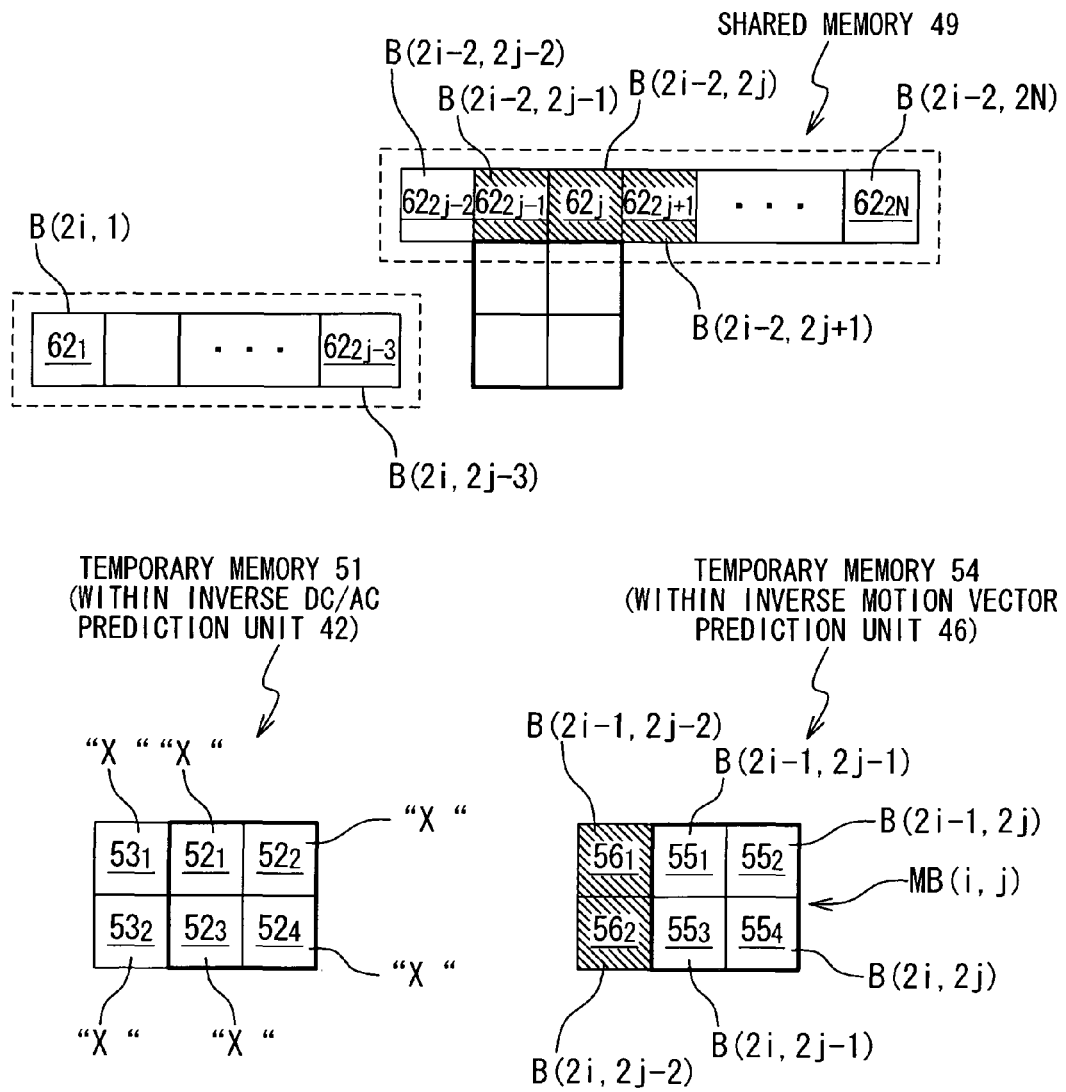
FIGS. 21A and 21B are conceptual views illustrating an exemplary procedure of the motion vector prediction for the intermediate macro block MB (i, j)

As shown in FIG. 20B, the reproduced DC and AC coefficients are stored in the object memory blocks $52_1$ to $52_4$ of the temporary memory 51 within the inverse DC/AC prediction unit 42. Specifically, after the DC and AC coefficients associated with the block B(2$i$–1, 2$j$–1) are reproduced, the reproduced DC and AC coefficients are stored in the object memory block $52_1$. Correspondingly, the reproduced DC and AC coefficients associated with blocks B(2$i$–1, 2$j$), B(2$i$, 2$j$–1) and B(2$i$, 2$j$) are stored in the object memory blocks $52_2$, $52_3$ and $52_4$, respectively. The reproduced DC and AC coefficients are sent from the object memory blocks $52_1$ to $52_4$ to the inverse quantizer 43.

This is followed by data transfer between the shared memory 49 and the temporary memories 51 and 54 to update the contents of the shared memory 49 and temporary memories 51 and 54, as shown in FIG. 20B. It should be noted that the data transfer for the intermediate macro block MB (i, j) is different from the data transfer for the leftmost macro block MB (i, 1.) (also see FIG. 10B)

In detail, as shown in FIG. 20B, the data associated with the block B(2$i$, 2$j$–2) adjacent to the left of the lower left block of the current macro block MB(i, j) is transferred to the memory block $62_{2j-2}$ of the shared memory 49. The data associated with the block B(2$i$, 2$j$–2) is transferred from selected one of the reference memory block $53_2$ of the temporary memory 51 within the inverse DC/AC prediction unit 42 and the reference memory blocks $56_2$ of the temporary memory 54 within the inverse motion vector prediction unit 46, in response to the compression mode of the macro block MB (i, j–1) adjacent to the left of the current macro block MB (i, j). When the macro block MB (i, j–1) adjacent to the left of the current macro block MB (i, j) is encoded by the intra-mode encoding, the data associated with the block B(2$i$, 2$j$–2) include DC and AC coefficients. The inverse DC/AC prediction unit 42 sends the DC and AC coefficients associated with the block B(2$i$, 2$j$–2) from the reference memory block $53_2$ to the memory block $62_{2j-2}$. On the other hand, when the adjacent macro block MB (i, j–1) is encoded by the inter-mode encoding, the data associated with the block B (2$i$, 2$j$–2) includes a motion vector. The inverse motion vector prediction unit 46 sends the motion vector associated with the block B (2$i$, 2$j$–2) from the reference memory block $56_2$ to the memory block $62_{2j-2}$.

Furthermore, the DC and AC coefficients associated with the lower left block B(2$i$, 2$j$–1) of the current macro block MB(i, j) are transferred from the object memory block $52_3$ of the temporary memory 51 to the memory block $62_{2j-1}$ of the shared memory 49. Additionally, the DC and AC coefficients associated with the two blocks B(2$i$–1, 2$j$) and B(2$i$, 2$j$) arranged in the right column of the current macro block MB (i, j) are transferred from the object memory blocks $52_2$, and $52_4$ of the temporary memory 51 to the reference memory blocks $53_1$ and $53_2$.

In addition, the invalid data are transferred from the object memory blocks $55_2$ and $55_4$ to the reference memory blocks $56_1$ and $56_2$ within the temporary memory 54 of the inverse motion vector prediction unit 46. This allows the inverse motion vector prediction unit 46 to recognize that the macro block MB (i, j) is processed by the intra-mode encoding when the macro block MB (i, j+1) is next processed. Thereby, the inverse DC/AC prediction processing of the macro block MB (i, j) is completed.

When the current macro block MB (i, j) is encoded by the inter-mode encoding, on the other hand, the motion vector differences and the control data attached therewith are sent from the variable-length decoder 41 to the inverse motion vector prediction unit 46, and the motion vectors are reproduced using the difference motion vectors and the control data received from the variable-length decoder 41, as shown in FIG. 21A. As described above, the control data indicate which reference blocks are used for the calculation of the motion vector differences. Specifically, the motion vectors reproduced for the blocks specified by the control data are read from the associated memory blocks, and the motion vectors of the respective blocks of the current macro block MB (i, j) are reproduced using the motion vectors read from the associated memory blocks and the motion vector differences. In FIG. 21A, the hatchings indicate the memory blocks from which the motion vectors may be allowed to be read.

Figure 21B:
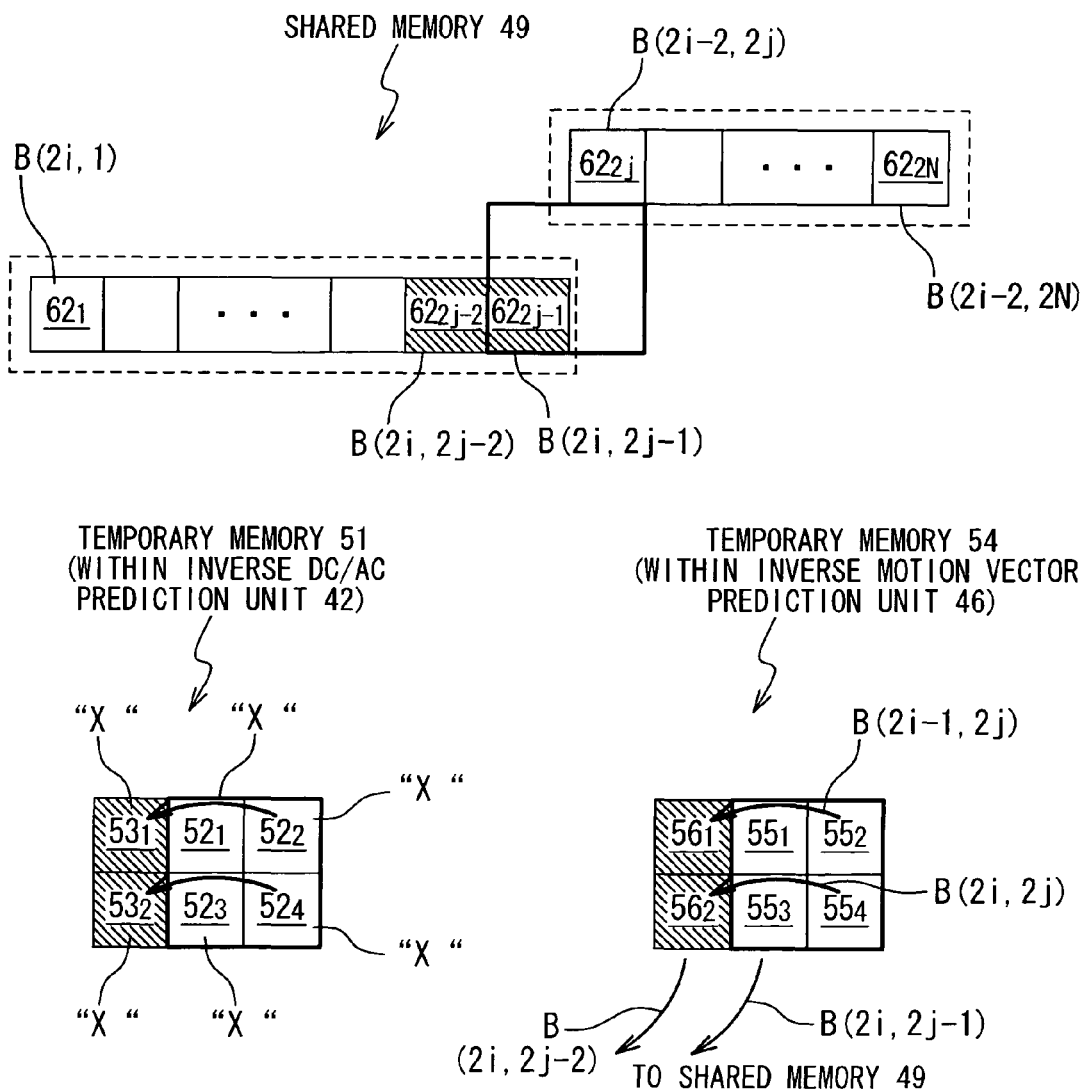
Figure 22A:
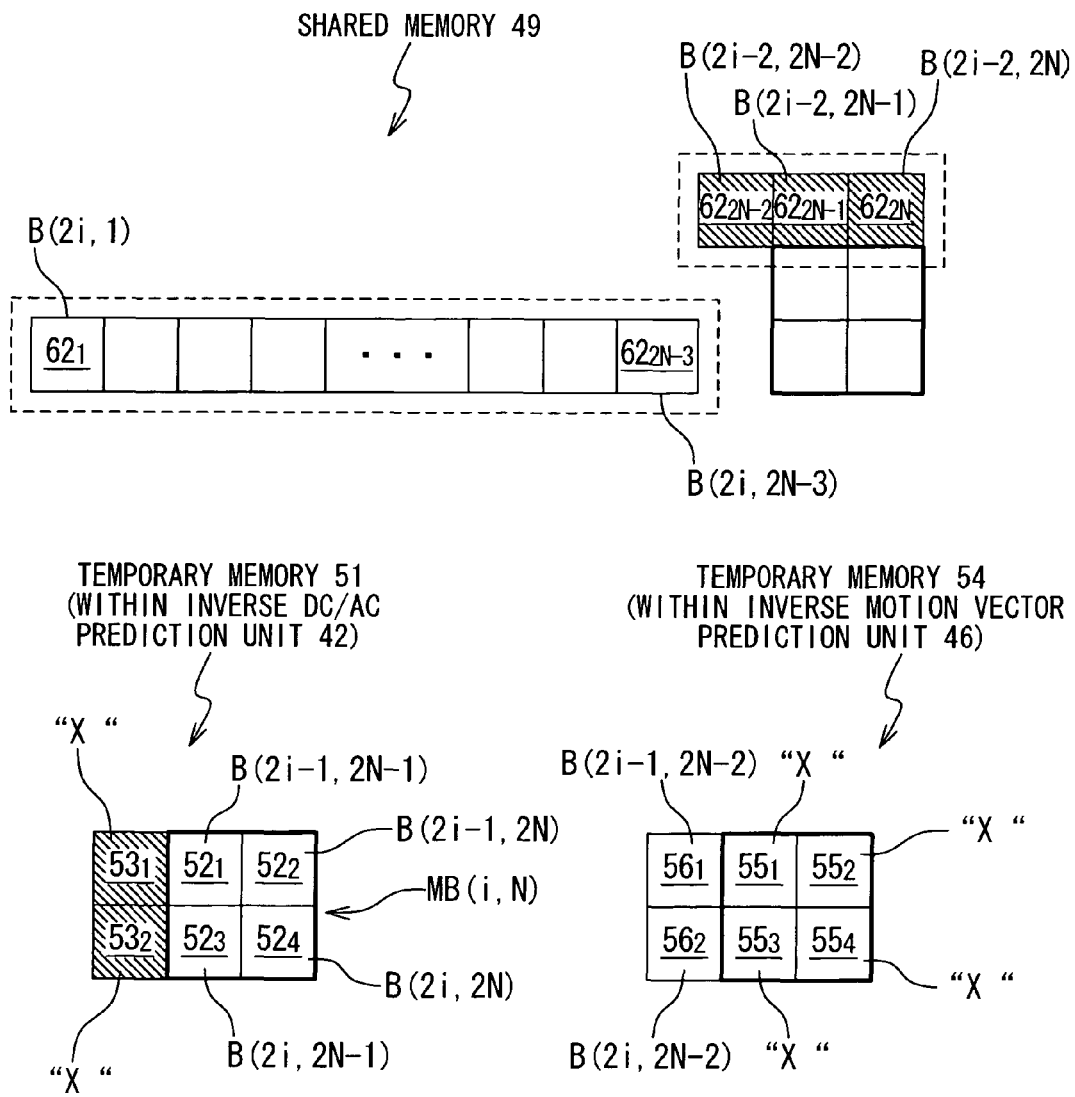

The reproduced motion vectors are stored in the object memory blocks $55_1$ to $55_4$ of the temporary memory 54 of the inverse motion vector prediction unit 46 as shown in FIG. 21B. Specifically, when the motion vector of the block B(2$i$–1, 1) is reproduced, the reproduced motion vector is stored in the object memory block $52_1$. Correspondingly, the reproduced motion vectors associated with the block B(2$i$–1, 2), B(2$i$, 1), and B(2$i$, 2) are stored in the object memory blocks $55_2$, $55_3$ and $55_4$, respectively. The reproduced motion vectors are sent to the motion compensation unit 48 from the object memory blocks $55_1$ to $55_4$.

This is followed by data transfer between the shared memory 49 and the temporary memories 51 and 54, to update the contents thereof, as shown in FIG. 20B. First, the data associated with the block B(2$i$, 2$j$–2) adjacent to the left of the lower left block of the current macro block MB(i, j) is transferred to the memory block $62_{2j-2}$ of the shared memory 49 in the same way as the case of the intra-mode encoding. When the macro block MB (i, j–1) adjacent to the left of the current macro block MB (i, j) is encoded by the intra-mode encoding, the data associated with the block B (2$i$, 2$j$–2) includes DC and AC coefficients, and the DC and AC coefficients associated with the block B (2$i$, 2$j$–2) are transferred from the reference memory block $53_2$ of the inverse DC/AC prediction unit 42 to the memory block $62_{2j-2}$. On the other hand, when the adjacent macro block MB(i, j–1) is encoded by the inter-mode encoding, the data associated with the block B(2$i$, 2$j$–2) includes a motion vector, and the motion vector associated with the block B(2$i$, 2$j$–2) is transferred from the reference memory block $56_2$ of the inverse motion vector prediction unit 4,6 to the memory block $62_{2j-2}$.

Furthermore, the motion vector associated with the lower left block B(2$i$, 2$j$–1) of the current macro block MB(i, j) is transferred from the object memory block $55_3$ of the temporary memory 54 to the memory block $62_{2j-1}$ of the shared memory 49. Additionally, the motion vectors associated with the two block B (2$i$–1, 2$j$), B (2$i$, 2$j$) arranged in the right column of the current macro block MB (i, j) are transferred from the object memory blocks $55_2$ and $55_4$ to the reference memory blocks $56_1$ and $56_2$ within the temporary memory 54.

In addition, the invalid data are transmitted from the object memory blocks $52_2$ and $52_4$ to the reference memory blocks $53_1$ and $53_2$ within the temporary memory 51 of the inverse DC/AC prediction unit 42. This allows the inverse DC/AC prediction unit 42 to recognize that the macro block MB (i, j) is encoded by the inter-mode encoding when the macro block MB (i, j+1) is next processed. Thereby, the inverse motion vector prediction processing of the macro block MB(i, j) is completed.

(2-C) Processing of Rightmost Macro Block MB(i, N)

FIGS. 22A, 22B 23A and 23B are conceptual views illustrating the processing of the rightmost macro block MB (i, N).

The processing of the inverse DC/AC prediction and the inverse motion vector prediction in the processing of the rightmost macro block MB (i, N) is almost similar to the processing of the intermediate macro blocks described above. The difference is that special data transfer is performed between the shared memory 49 and the temporary memories 51 and 54.

Figure 23A:
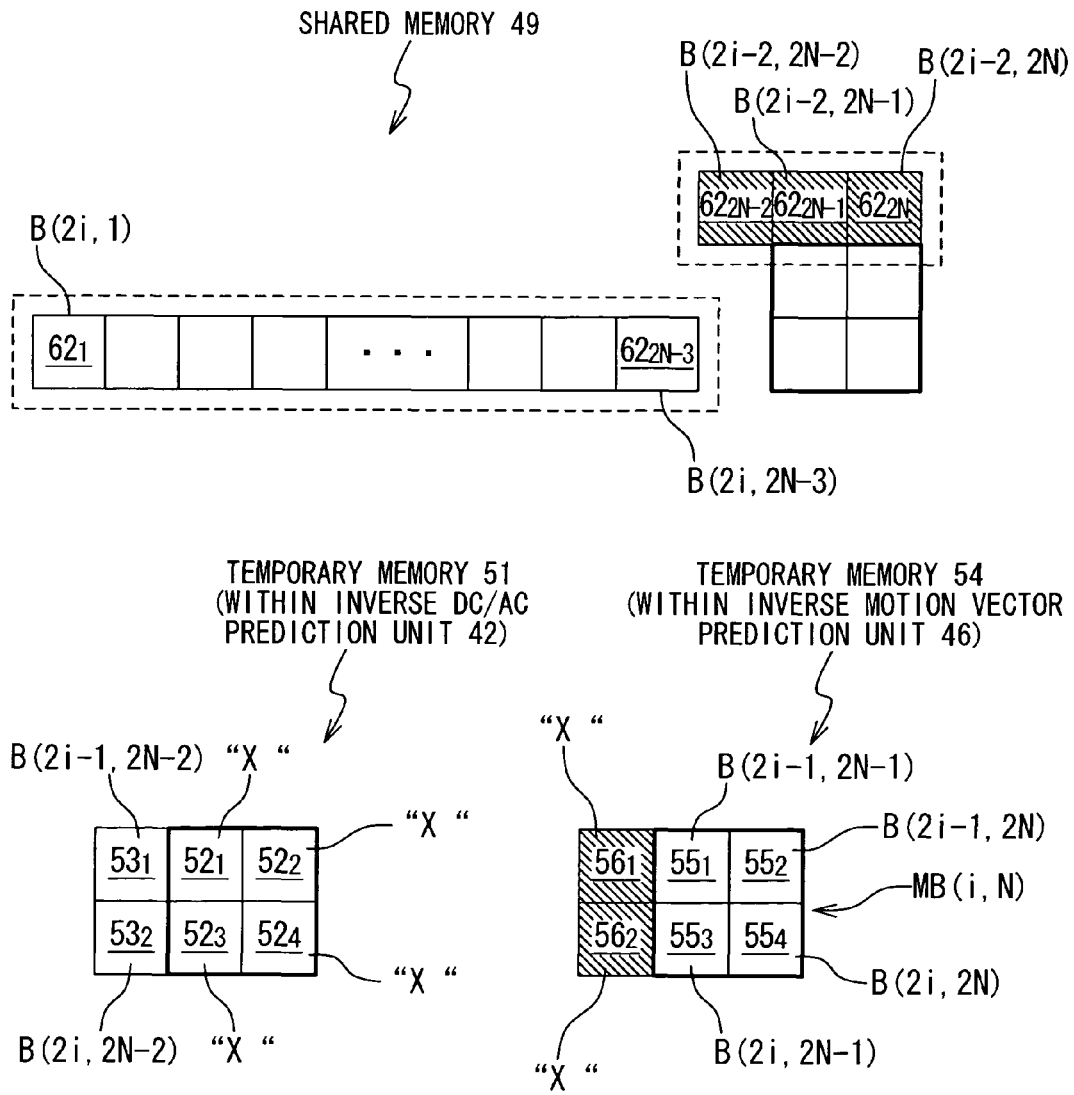
FIGS. 23A and 23B are conceptual views illustrating an exemplary procedure of the motion vector prediction for the rightmost macro block MB (i, N).
Figure 23B:
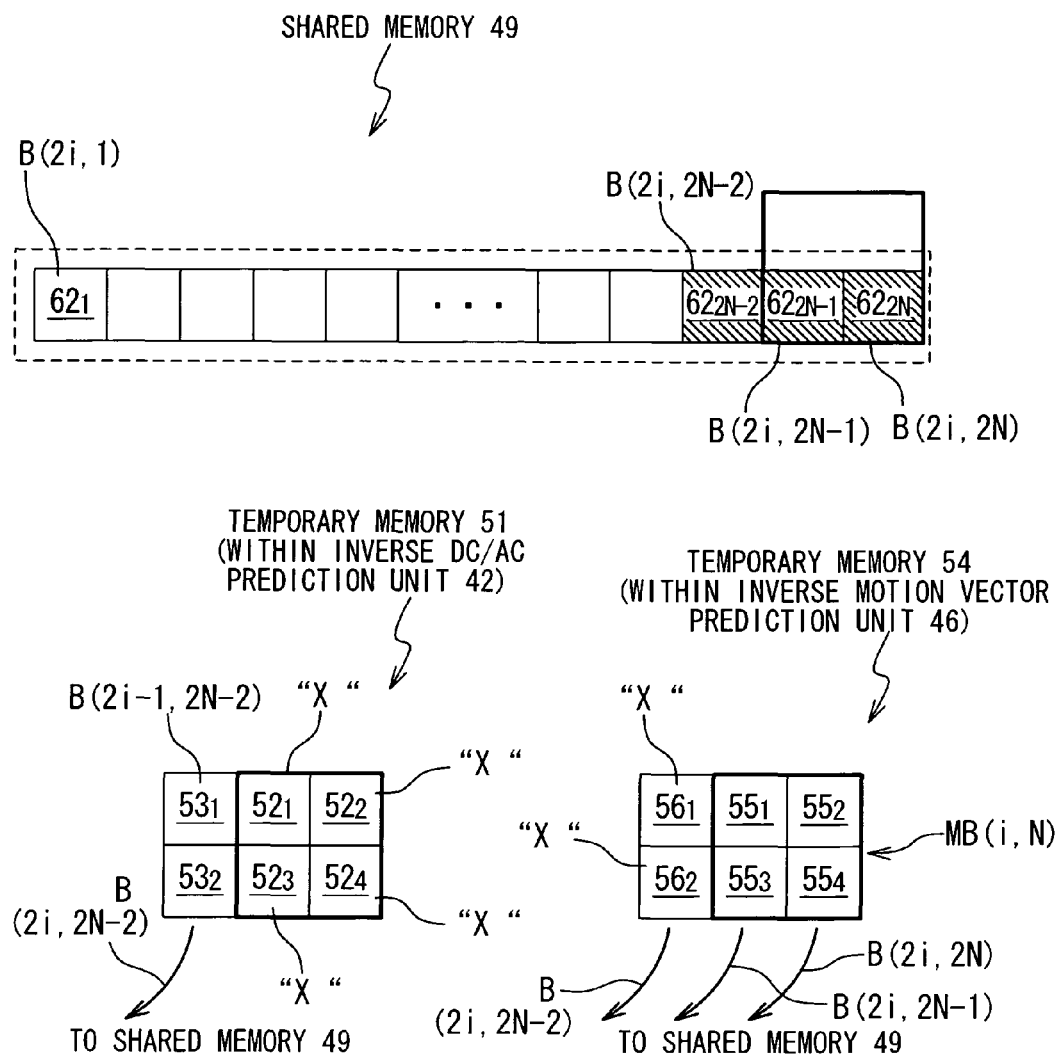

After the inverse DC/AC prediction or the inverse motion vector prediction of the macro block MB(i, N) is completed, as shown in FIGS. 22B and 23B, the reproduced data associated with the block B ($2i, 2j-2$) adjacent to the left of the lower left block of the current macro block MB (i, j) is first transmitted to the memory block $62_{2j-2}$ of the shared memory 49, regardless of the compression mode of the macro block MB (i, N). In detail, when the macro block MB (i, j−1) adjacent to the left of the current macro block MB (i, j) is encoded by the intra-mode encoding, the reproduced data associated with the block B ($2i, 2j-2$) includes DC and AC coefficients, and the DC and AC coefficient associated with the block B($2i, 2j-2$) are transferred from the reference memory block $53_2$ of the inverse DC/AC prediction unit 42 to the memory block $62_{2j-2}$. On the other hand, when the adjacent macro block MB(i, j−1) is encoded by the inter-mode encoding, the reproduced data associated with the block B($2i, 2j-2$) includes a motion vector, and the motion vector associated with the block B($2i, 2j-2$) is transferred from the reference memory block $56_2$ of the inverse motion vector prediction unit 46 to the memory block $62_{2j-2}$.

Furthermore, when the macro block MB (i, N) is encoded by the intra-mode encoding, as shown in FIG. 22B, the DC and AC coefficients reproduced for the two blocks B (2 i, 2N-1), and B ($2i$, 2N) arranged in the lower row of the current macro block MB (i, j) are transferred from the object memory blocks $52_3$ and $52_4$ of the temporary memory 51 to the memory blocks $62_{2\,N-1}$ and $62_{2N}$ of the shared memory 49. Thereby, the data associated with the block line in the lower row of the macro blocks MB(i, 1) to MB(i, N) in the i-th macro block line is completely prepared in the shared memory 49. This implies that the preparation is completed for the processing of the macro blocks MB(i+1, 1) to MB(i+1, N) in the next macro block line.

On the other hand, when the macro block MB(i, N) is encoded by the inter-mode encoding, the motion vectors associated with the two blocks B($2i$, 2N-1) and B($2i$, 2N) arranged in the lower row of the current macro block MB(i, j) are transferred from the object memory blocks $55_3$ and $55_4$ of the temporary memory 54 to the memory blocks $62_{2N-1}$ and $62_{2N}$ of the shared memory 49, after the inverse motion vector prediction is completed for the macro block MB(i, N). Thereby, the data of the block line arranged at the bottom of the macro blocks MB(i, 1) to MB(i, N) in the i-th macro block line are completely prepared in the shared memory 49. This implies that the preparation is completed for the processing of the macro blocks MB(i+1, 1) to MB(i+1, N) in the next macro block.

3. Summary and Complement

The architecture and operation described above effectively achieve the inverse DC/AC prediction and the inverse motion vector prediction with reduced memory resources. This is effective for the reduction of the hardware of the video decoder 40.

Although the video decoder 40 in this embodiment is designed to support the MPEG4 SP specification, it is apparent to those skilled in the art that the present invention can be applied to any video encoder adapted to both of the inverse DC/AC prediction and the inverse motion vector prediction with minor changes.

For example, the video decoder 40 in this embodiment may be adapted to support the MPEG4 ASP (advanced simple profile) specification with changes in the structure and operation for supporting the bidirectional prediction. In this case, the forward and backward motion vectors are reproduced using the motion vector differences, and are sent to the motion compensation unit 48. The motion compensation unit 48 generates the motion-compensated video data from the forward and backward motion vectors.

It is apparent that the present invention is not limited to the above-described embodiments, which may be modified and changed without departing from the scope of the invention.

What is claimed is:

1. A video encoder comprising:
   a DC/AC prediction unit performing DC/AC prediction;
   a motion vector prediction unit performing motion vector prediction; and
   a memory accessible from both of said DC/AC prediction unit and said motion vector prediction unit, wherein said DC/AC prediction unit is configured to store DC and AC coefficients in said memory, and to calculate DC and AC coefficient difference data from said stored DC and AC coefficients, and
   wherein said motion vector prediction unit is configured to store a motion vector in said memory, and to calculate a motion vector difference from said stored motion vectors.

2. The video encoder according to claim 1, wherein said memory includes a plurality of memory areas associated with a plurality of macro blocks, respectively, and
   wherein one of said memory areas exclusively stores said DC and AC coefficients or said motion vector.

3. The video encoder according to claim 2, wherein said DC/AC prediction unit is configured to obtain data associated with reference blocks defined for a current block from associated ones of said plurality of memory areas when calculating DC and AC coefficient difference data associated with said current block, to identify a kind of said obtained data, and to disregard said obtained data, when said obtained data includes said motion vector.

4. The video encoder according to claim 2, wherein said motion vector prediction unit is configured to obtain data associated with reference blocks defined for a current block from associated ones of said plurality of memory areas when calculating a motion vector difference associated with said current block, to identify a kind of said obtained data, and to disregard said obtained data, when said obtained data includes DC and AC coefficients.

5. The video encoder according to claim 2, wherein each of said plurality of memory areas includes two memory blocks associated with lower two blocks of a macro block associated therewith, and
   wherein said memory blocks are designed to exclusively store DC and AC coefficients associated with said lower two blocks or motion vectors associated with said lower two blocks.

6. The video encoder according to claim 5, wherein said DC/AC prediction unit includes a temporary memory storing DC and AC coefficients associated with respective blocks within a current macro block, and storing DC and AC coefficients associated with blocks adjacent to the left of said current macro block;
   wherein said DC and AC coefficients stored in said memory blocks within said plurality of memory areas includes DC and AC coefficients associated with blocks located in a block line adjacent to the top of said current macro block.

7. The video encoder according to claim 5, wherein said motion vector prediction unit includes a temporary memory storing motion vectors associated with respective blocks within a current macro block, and storing motion vectors associated with blocks adjacent to the left of said current macro block;

wherein said motion vectors stored in said memory blocks within said plurality of memory areas includes motion vectors associated with blocks located in a block line adjacent to the top of said current macro block.

8. A video decoder comprising:

an inverse DC/AC prediction unit performing inverse DC/AC prediction;

an inverse motion vector prediction unit performing inverse motion vector prediction; and a memory accessible from both of said inverse DC/AC prediction unit and said inverse motion vector prediction unit, wherein said inverse DC/AC prediction unit is configured to receive first DC and AC coefficients stored in said memory and DC and AC coefficient difference data, to reproduce second DC and AC coefficients from said first DC and AC coefficient difference data and said DC and AC coefficient difference data, and to store said reproduced second DC and AC coefficients in said memory, and wherein said inverse motion vector prediction unit is configured to receive a first motion vector stored in said memory and a motion vector difference, to reproduce a second motion vector from said first motion vector and said motion vector difference, and to store said reproduced second motion vector in said memory.

9. The video decoder according to claim 8, wherein said memory includes a plurality of memory areas associated with a plurality of macro blocks, respectively, and wherein one of said plurality of memory areas exclusively stores said first DC and AC coefficients or said first motion vector.

10. The video decoder according to claim 9, wherein each of said plurality of memory areas includes two memory blocks associated with lower two blocks of a macro block associated therewith, and wherein said memory blocks are designed to exclusively store reproduced DC and AC coefficients associated with said lower two blocks or reproduced motion vectors associated with said lower two blocks.

* * * * *